(12) United States Patent
Georgiev et al.

(10) Patent No.: US 10,092,834 B2
(45) Date of Patent: Oct. 9, 2018

(54) DYNAMIC ALLOCATION OF RENDERING RESOURCES IN A CLOUD GAMING SYSTEM

(71) Applicant: KABUSHIKI KAISHA SQUARE ENIX HOLDINGS, Tokyo (JP)

(72) Inventors: Stephan Georgiev, Montreal (CA); Tomokazu Otani, Tokyo (JP); Sanro Zlobec, Montreal (CA)

(73) Assignee: KABUSHIKI KAISHA SQUARE ENIX HOLDINGS, Tokyo (JP)

( * ) Notice: Subject to any disclaimer, the term of this patent is extended or adjusted under 35 U.S.C. 154(b) by 355 days.

(21) Appl. No.: 14/432,046

(22) PCT Filed: May 23, 2013

(86) PCT No.: PCT/CA2013/000505
§ 371 (c)(1),
(2) Date: Mar. 27, 2015

(87) PCT Pub. No.: WO2014/186858
PCT Pub. Date: Nov. 27, 2014

(65) Prior Publication Data
US 2016/0059125 A1 Mar. 3, 2016

(51) Int. Cl.
*A63F 9/24* (2006.01)
*A63F 13/355* (2014.01)
(Continued)

(52) U.S. Cl.
CPC .......... *A63F 13/355* (2014.09); *A63F 13/216* (2014.09); *A63F 13/352* (2014.09);
(Continued)

(58) Field of Classification Search
None
See application file for complete search history.

(56) References Cited

U.S. PATENT DOCUMENTS 7,830,388 B1 11/2010 Lu
8,147,339 B1 4/2012 Perry
(Continued)

FOREIGN PATENT DOCUMENTS

EP 2319597 5/2011
GB 2447094 9/2008
(Continued)

OTHER PUBLICATIONS

Extended European Search Report from European Patent Office (EPO) in European Patent Appl. No. 13885078.9, dated Jan. 4, 2017.
(Continued)

*Primary Examiner* — Paul A D'Agostino
(74) *Attorney, Agent, or Firm* — Greenblum & Bernstein, P.L.C.

(57) ABSTRACT

Provided is a method that includes generating sets of rendering commands for rendering video content for a client device and directing each of the sets of rendering commands to at least one rendering resource from a group of at least two rendering resources, such that each of the rendering resources has at least some of the sets of rendering commands directed to it. The action of directing may include directing each set of rendering commands to a rendering resource, from among the at least two rendering resources, that is designated as an allocated rendering resource for the client device. The method may further include changing which of the at least two rendering resources is designated as the allocated rendering resource for the client device.

20 Claims, 14 Drawing Sheets

(51) Int. Cl.
*A63F 13/352* (2014.01)
*A63F 13/216* (2014.01)
*A63F 13/358* (2014.01)
*H04L 29/08* (2006.01)
*G06F 3/14* (2006.01)
*G06F 9/50* (2006.01)
*H04N 21/434* (2011.01)
*H04L 29/06* (2006.01)

(52) U.S. Cl.
CPC ............. *A63F 13/358* (2014.09); *G06F 3/14* (2013.01); *G06F 9/505* (2013.01); *G06F 9/5027* (2013.01); *H04L 67/32* (2013.01); *H04L 67/38* (2013.01); *H04L 69/14* (2013.01); *G09G 2370/022* (2013.01); *H04L 65/602* (2013.01); *H04N 21/4345* (2013.01); *Y02D 50/30* (2018.01)

(56) References Cited

U.S. PATENT DOCUMENTS

| | | | |
|---|---|---|---|
| 8,154,553 B2 | 4/2012 | Peterfreund | |
| 8,264,493 B2 | 9/2012 | Peterfreund | |
| 8,348,752 B2 | 1/2013 | Berner et al. | |
| 8,632,408 B2 | 1/2014 | Gillo et al. | |
| 8,678,915 B2 | 3/2014 | Berner et al. | |
| 9,022,857 B2 | 5/2015 | Berner et al. | |
| 2005/0262254 A1* | 11/2005 | Sherwani | H04L 29/06027 709/231 |
| 2009/0275414 A1 | 11/2009 | Lee et al. | |
| 2009/0278842 A1 | 11/2009 | Peterfreund | |
| 2009/0289945 A1* | 11/2009 | Peterfreund | A63F 13/12 345/505 |
| 2010/0166065 A1 | 7/2010 | Perlman et al. | |
| 2010/0285884 A1 | 11/2010 | Gauer, III et al. | |
| 2011/0088071 A1 | 4/2011 | Yerli | |
| 2011/0227934 A1 | 9/2011 | Sharp | |
| 2011/0300946 A1 | 12/2011 | Stafford et al. | |
| 2012/0004040 A1 | 1/2012 | Pereira et al. | |
| 2012/0050300 A1 | 3/2012 | Chun et al. | |
| 2012/0071244 A1 | 3/2012 | Gillo et al. | |
| 2012/0149476 A1 | 6/2012 | Perlman et al. | |
| 2012/0166645 A1* | 6/2012 | Boldyrev | G06F 9/5083 709/226 |
| 2012/0283018 A1 | 11/2012 | Berner et al. | |
| 2013/0065695 A1 | 3/2013 | Berner et al. | |
| 2013/0344966 A1 | 12/2013 | Mustafa | |
| 2014/0148254 A1 | 5/2014 | Berner et al. | |
| 2014/0274366 A1* | 9/2014 | Elias | G07F 17/3267 463/29 |
| 2015/0194136 A1* | 7/2015 | Diard | G09G 5/393 345/547 |
| 2016/0027246 A1* | 1/2016 | Newton | G07F 17/3237 463/16 |

FOREIGN PATENT DOCUMENTS

| | | |
|---|---|---|
| WO | 2009/138878 | 11/2009 |
| WO | 2012/107739 | 8/2012 |
| WO | 2013/069654 | 5/2013 |

OTHER PUBLICATIONS

Humphreys et al., "Chromium: A Stream-Processing Framework for Interactive Rendering on Clusters", ACM Transactions on Graphics (TOG), ACM, pp. 693-702 (Jul. 1, 2002).
International Search Report (ISR) and Written Opinion (WO) from International Searching Authority (ISA) in International Patent Application No. PCT/CA2013/000505, dated Feb. 10, 2014.
Office Action from Canadian Intellectual Property Office in Canadian Patent Appl. No. 2,886,282, dated Feb. 21, 2017.
Office Action from Canadian Intellectual Property Office in Canadian Patent Appl. No. 2,886,282, dated Apr. 22, 2016.

* cited by examiner

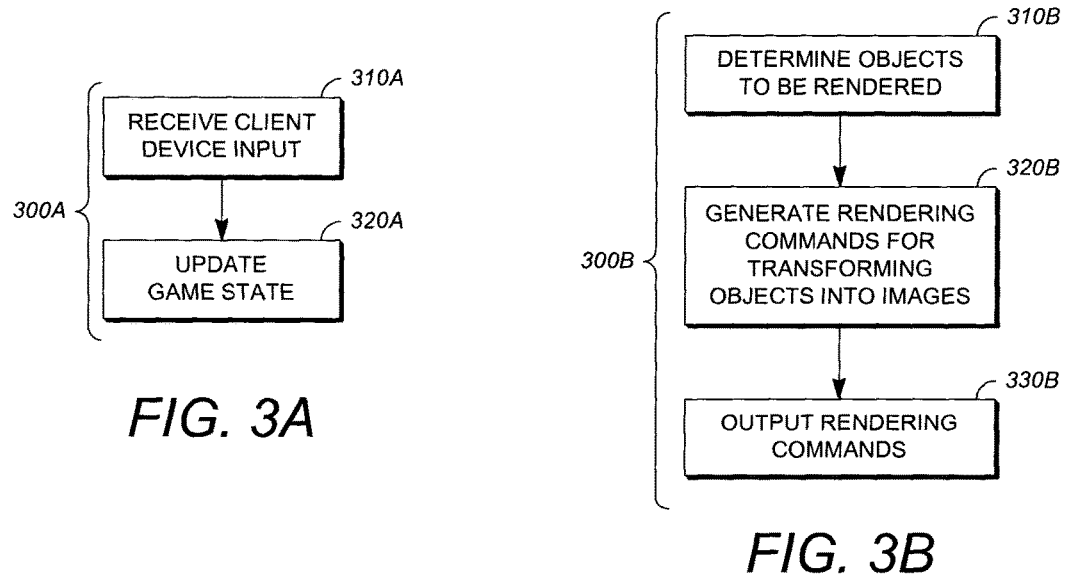
FIG. 3A
FIG. 3B
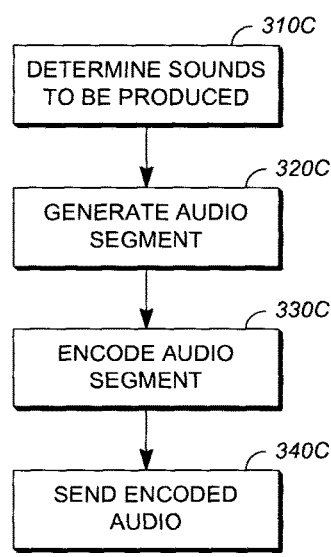
FIG. 3C

DYNAMIC ALLOCATION OF RENDERING RESOURCES IN A CLOUD GAMING SYSTEM

FIELD OF THE INVENTION

Some aspects of the present invention relate generally to video games and, in particular, to allocation of rendering resources in a cloud gaming system.

BACKGROUND

The video game industry has seen considerable evolution, from the introduction of stand-alone arcade games, to home-based computer games, to the emergence of games made for specialized consoles. Democratization of the Internet then enabled the next major development, namely "cloud gaming". In a cloud gaming system, a player can utilize an ordinary Internet-enabled appliance such as a smartphone or tablet to connect to a video game server over the Internet. The video game server starts a session for the player, and may do so for multiple players. The video game server renders frames of video content and generates audio for the player based on player actions (e.g., moves, selections) and other attributes of the game. Encoded video and audio is delivered to the player's device over the Internet, and is reproduced as visible images and audible sounds. In this way, players from anywhere in the world can play a video game without the use of specialized video game consoles, software or graphics processing hardware.

To ensure a pleasurable experience for players, particularly those using mobile devices, there is a need to adequately manage video content rendering resources in a cloud gaming system.

SUMMARY OF THE INVENTION

A first broad aspect of the present invention seeks to provide a computer implemented method, comprising: generating sets of rendering commands for rendering video content for a client device; and directing each of the sets of rendering commands to at least one rendering resource from a group of at least two rendering resources such that each of the rendering resources has at least some of the sets of rendering commands directed to it.

A second broad aspect of the present invention seeks to provide a computer-readable storage medium comprising computer-readable instructions which, when executed by a computing entity, cause the computing entity to implement a method that comprises: generating sets of rendering commands for rendering video content for a client device; and directing each of the sets of rendering commands to at least one rendering resource from a group of at least two rendering resources such that each of the rendering resources has at least some of the sets of rendering commands directed to it.

A third broad aspect of the present invention seeks to provide an apparatus, comprising: a control module for generating sets of rendering commands for rendering video content for a client device; and an output controller for directing each of the sets of rendering commands to at least one rendering resource from a group at least two rendering resources such that each of the rendering resources has at least some of the sets of rendering commands directed to it.

A fourth broad aspect of the present invention seeks to provide a server system, comprising: a first rendering server configured for generating first video frames for a client device based on first sets of rendering commands received while the first rendering server is designated as an allocated rendering server for the client device, and for sending the first video frames to the client device; and a second rendering server configured for generating second video frames for the client device based on second sets of rendering commands received while the second rendering server is designated as an allocated rendering server for the client device, and for sending the second video frames to the client device.

A fifth broad aspect of the present invention seeks to provide a method for execution by a processing entity of a client device engaged in a session over the Internet with a control server, comprising: sending input to the control server over the Internet; responsive to the input, receiving first video content via the Internet from a first rendering resource and receiving second video content via the Internet from a second rendering resource different from the first rendering resource; and displaying the first video content and then the second video content via a display of the client device.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 3A to 3C are flowcharts showing execution of a set of processes carried out during execution of a video game, in accordance with non-limiting embodiments of the present invention.

It is to be expressly understood that the description and drawings are only for the purpose of illustration of certain embodiments of the invention and are an aid for understanding. They are not intended to be a definition of the limits of the invention.

DETAILED DESCRIPTION

I. Cloud Gaming Architecture

Figure 1:
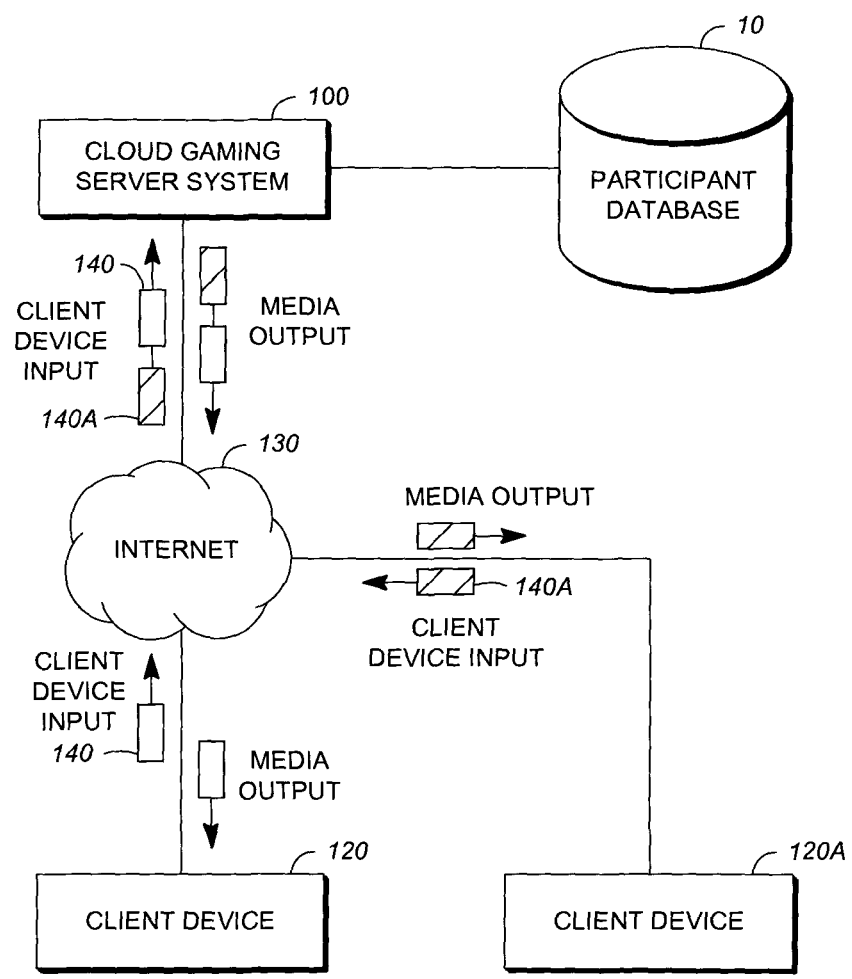
FIG. 1 is a block diagram of a cloud-based video game system architecture, according to a non-limiting embodiment of the present invention.

FIG. 1 schematically shows a cloud-based video game system architecture according to a non-limiting embodiment of the present invention. The architecture includes a plurality of client devices 120, 120A connected to a cloud gaming server system 100 over the Internet 130. Each of the client devices 120, 120A may connect to the Internet 130 in any suitable manner, including over a respective local access network (not shown). The cloud gaming server system 100 may also connect to the Internet 130 over a local access network (not shown), although the server system 100 may connect directly to the Internet 130 without the intermediary of a local access network. Connections between the cloud gaming server system 100 and one or more of the client devices 120, 120A may comprise one or more channels. These channels can be made up of physical and/or logical links, and may travel over a variety of physical media, including radio frequency, fiber optic, free-space optical, coaxial and twisted pair. The channels may abide by a protocol such as UDP or TCP/IP. Also, one or more of the channels may be supported a virtual private network (VPN). In some embodiments, one or more of the connections may be session-based.

The cloud gaming server system 100 enables users of the client devices 120, 120A to play video games, either individually (i.e., a single-player video game) or in groups (i.e., a multiplayer video game). Non-limiting examples of video games may include games that are played for leisure, education and/or sport. A video game may but need not offer participants the possibility of monetary gain. Although only two client devices 120, 120A are shown, it should be appreciated that the number of client devices in the cloud-based video game system architecture is not particularly limited.

A user of one of the client devices 120, 120A may register with the cloud gaming server system 100 as a participant in a video game. The user may register as a "player", and will have the opportunity to control a character, avatar, race car, cockpit, etc. within a virtual world maintained by the video game. In the case of a multi-player video game, the virtual world is shared by two or more players, and one player's gameplay may affect that of another. In some embodiments, a user of one of the client devices 120, 120A may register as a non-player "spectator", whereby such users will observe players' gameplay but otherwise do not control active characters in the game. Unless otherwise indicated, where the term "participant" is used, it is meant to apply equally to players and spectators.

Parameters related to various players and spectators can be stored in a participant database 10, which can be part of the cloud gaming server system 100 or situated remotely therefrom.

The configuration of any given one of the client devices 120, 120A is not particularly limited. In some embodiments, one or more of the client devices 120, 120A may be, for example, a personal computer (PC), a home game machine (console such as XBOX™, PS3™, Wii™, etc.), a portable game machine, a smart television, a set-top box (STB), etc. In other embodiments, one or more of the client devices 120, 120A may be a communication or computing device such as a mobile phone, a personal digital assistant (PDA), or a tablet.

Any given one of the client devices 120, 120A may be equipped with one or more input devices (such as a touch screen, a keyboard, a game controller, a joystick, etc.) to allow users of the given client device to provide input and participate in a video game. In other embodiments, the user may produce body motion or may wave an external object; these movements are detected by a camera or other sensor (e.g., Kinect™), while software operating within the given client device attempts to correctly guess whether the user intended to provide input to the given client device and, if so, the nature of such input. The given client device translates the received user inputs and detected user movements into "client device input", which is sent to the cloud gaming server system 100 over the Internet 130. In the illustrated embodiment, client device 120 produces client device input 140, while client device 120A produces client device input 140A.

The cloud gaming server system 100 processes the client device input 140, 140A received from the various client devices 120, 120A and generates "media output" for the various client devices 120, 120A. The media output may include frames of encoded video content (i.e., perceived as images when reproduced on a screen) and audio (i.e., perceived as sound when reproduced). The media output is sent over the Internet 130 in the form of packets. Packets destined for a particular one of the client devices 120, 120A may be addressed in such a way as to be routed to that device over the Internet 130. Each of the client devices 120, 120A may include circuitry for buffering and processing the media output in the packets received from the cloud gaming server system 100, as well as a display for displaying images and a transducer (e.g., a loudspeaker) for outputting audio. Additional output devices may also be provided, such as an electro-mechanical system to induce motion.

It should be appreciated that term "frame" as used herein does not require the existence of a one-to-one correspondence between frames of video content and images as perceived on a screen. That is to say, while it is possible for each frame to contain data representing a respective displayed image in its entirety, it is also possible for a frame to contain data representing only part of an image, and for the image to in fact require two or more frames in order to be properly reconstructed and displayed. By the same token, a frame may contain data representing more than one complete image, such that N images may be represented using M frames, where M<N.

II. Cloud Gaming Server System 100 (Distributed Architecture)

Figure 2A:
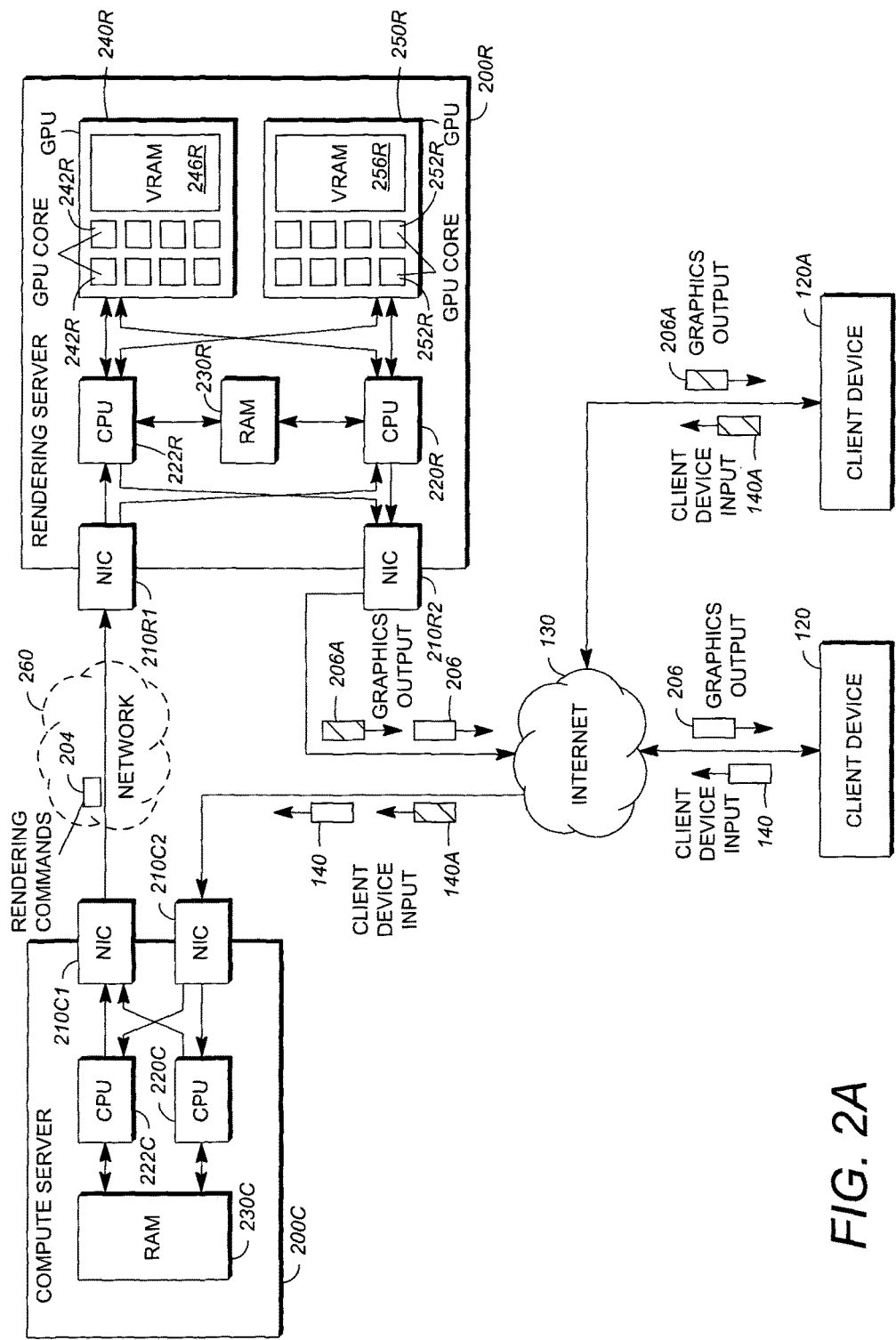
FIG. 2A is a block diagram showing various physical components of the architecture of FIG. 1, according to a non-limiting embodiment of the present invention.

FIG. 2A shows one possible non-limiting physical arrangement of components for the cloud gaming server system 100. In this embodiment, individual servers within the cloud gaming server system 100 are configured to carry out specialized functions. For example, a compute server 200C may be primarily responsible for tracking state changes in a video game based on user input, while a rendering server 200R may be primarily responsible for rendering graphics (video content).

For the purposes of the presently described example embodiment, both client device 120 and client device 120A are assumed to be participating in the video game, either as players or spectators. However, it should be understood that in some cases there may be a single player and no spectator, while in other cases there may be multiple players and a single spectator, in still other cases there may be a single player and multiple spectators and in yet other cases there may be multiple players and multiple spectators.

For the sake of simplicity, the following description refers to a single compute server 200C connected to a single rendering server 200R. However, it should be appreciated that there may be more than one rendering server 200R connected to the same compute server 200C, or more than one compute server 200C connected to the same rendering server 200R. In the case where there are plural rendering servers 200R, these may be distributed over any suitable geographic area.

As shown in the non-limiting physical arrangement of components in FIG. 2A, the compute server 200C comprises one or more central processing units (CPUs) 220C, 222C and a random access memory (RAM) 230C. The CPUs 220C, 222C can have access to the RAM 230C over a communication bus architecture, for example. While only two CPUs 220C, 222C are shown, it should be appreciated that a greater number of CPUs, or only a single CPU, may be provided in some example implementations of the compute server 200C. The compute server 200C also comprises a network interface component (NIC) 210C2, where client device input is received over the Internet 130 from each of the client devices participating in the video game. In the presently described example embodiment, both client device 120 and client device 120A are assumed to be participating in the video game, and therefore the received client device input may include client device input 140 and client device input 140A.

The compute server 200C further comprises another network interface component (NIC) 210C1, which outputs a plurality of sets of rendering commands 204. The sets of rendering commands 204 output from the compute server 200C via the NIC 210C1 can be sent to the rendering server 200R. In one embodiment, the compute server 200C can be connected directly to the rendering server 200R. In another embodiment, the compute server 200C can be connected to the rendering server 200R over a network 260, which can be the Internet 130 or another network. A virtual private network (VPN) may be established between the compute server 200C and the rendering server 200R over the network 260.

At the rendering server 200R, the sets of rendering commands 204 sent by the compute server 200C are received at a network interface component (NIC) 210R1 and are directed to one or more CPUs 220R, 222R. The CPUs 220R, 222R are connected to a plurality of graphics processing units (GPUs) 240R, 250R. By way of non-limiting example, GPU 240R may include a set of GPU cores 242R and a video random access memory (VRAM) 246R. Similarly, GPU 250R may include a set of GPU cores 252R and a video random access memory (VRAM) 256R. Each of the CPUs 220R, 222R may be connected to each of the GPUs 240R, 250R or to a subset of the GPUs 240R, 250R. Communication between the CPUs 220R, 222R and the GPUs 240R, 250R can be established using, for example, a communications bus architecture. Although only two CPUs and two GPUs are shown, there may be more than two CPUs and GPUs, or even just a single CPU or GPU, in a specific example of implementation of the rendering server 200R.

The CPUs 220R, 222R cooperate with the GPUs 240R, 250R to convert the sets of rendering commands 204 into a plurality of graphics output streams for the participating client devices. In the present embodiment, there are two graphics output streams 206, 206A for the client devices 120, 120A, respectively. This will be described in further detail later on. The rendering server 200R comprises a further network interface component (NIC) 210R2, through which the graphics output streams 206, 206A are sent to the client devices 120, 120A, respectively.

III. Cloud Gaming Server System 100 (Hybrid Architecture)

Figure 2B:
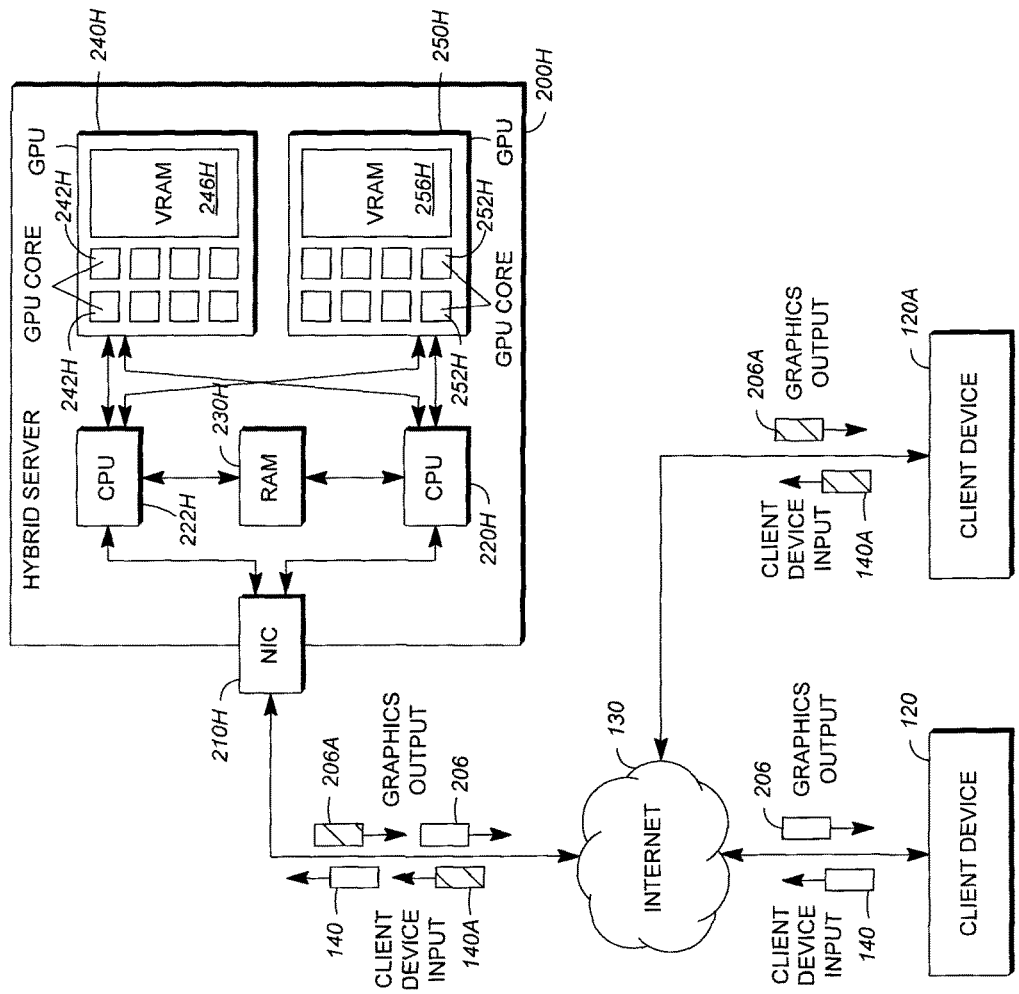
FIG. 2B is a variant of FIG. 2A.

FIG. 2B shows a second possible non-limiting physical arrangement of components for the cloud gaming server system 100. In this embodiment, a hybrid server 200H is responsible both for tracking state changes in a video game based on user input, and for rendering graphics (video content).

As shown in the non-limiting physical arrangement of components in FIG. 2B, the hybrid server 200H comprises one or more central processing units (CPUs) 220H, 222H and a random access memory (RAM) 230H. The CPUs 220H, 222H can have access to the RAM 230H over a communication bus architecture, for example. While only two CPUs 220H, 222H are shown, it should be appreciated that a greater number of CPUs, or only a single CPU, may be provided in some example implementations of the hybrid server 200H. The hybrid server 200H also comprises a network interface component (NIC) 210H, where client device input is received over the Internet 130 from each of the client devices participating in the video game. In the presently described example embodiment, both client device 120 and client device 120A are assumed to be participating in the video game, and therefore the received client device input may include client device input 140 and client device input 140A.

In addition, the CPUs 220H, 222H are connected to a plurality of graphics processing units (GPUs) 240H, 250H. By way of non-limiting example, GPU 240H may include a set of GPU cores 242H and a video random access memory (VRAM) 246H. Similarly, GPU 250H may include a set of GPU cores 252H and a video random access memory (VRAM) 256H. Each of the CPUs 220H, 222H may be connected to each of the GPUs 240H, 250H or to a subset of the GPUs 240H, 250H. Communication between the CPUs 220H, 222H and the GPUs 240H, 250H can be established using, for example, a communications bus architecture. Although only two CPUs and two GPUs are shown, there may be more than two CPUs and GPUs, or even just a single CPU or GPU, in a specific example of implementation of the hybrid server 200H.

The CPUs 220H, 222H cooperate with the GPUs 240H, 250H to convert the sets of rendering commands 204 into graphics output streams for the participating client devices. In this embodiment, there are two graphics output streams 206, 206A for the participating client devices 120, 120A, respectively. The graphics output streams 206, 206A are sent to the client devices 120, 120A, respectively, via the NIC 210H.

IV. Cloud Gaming Server System 100 (Functionality Overview)

Figure 2C:
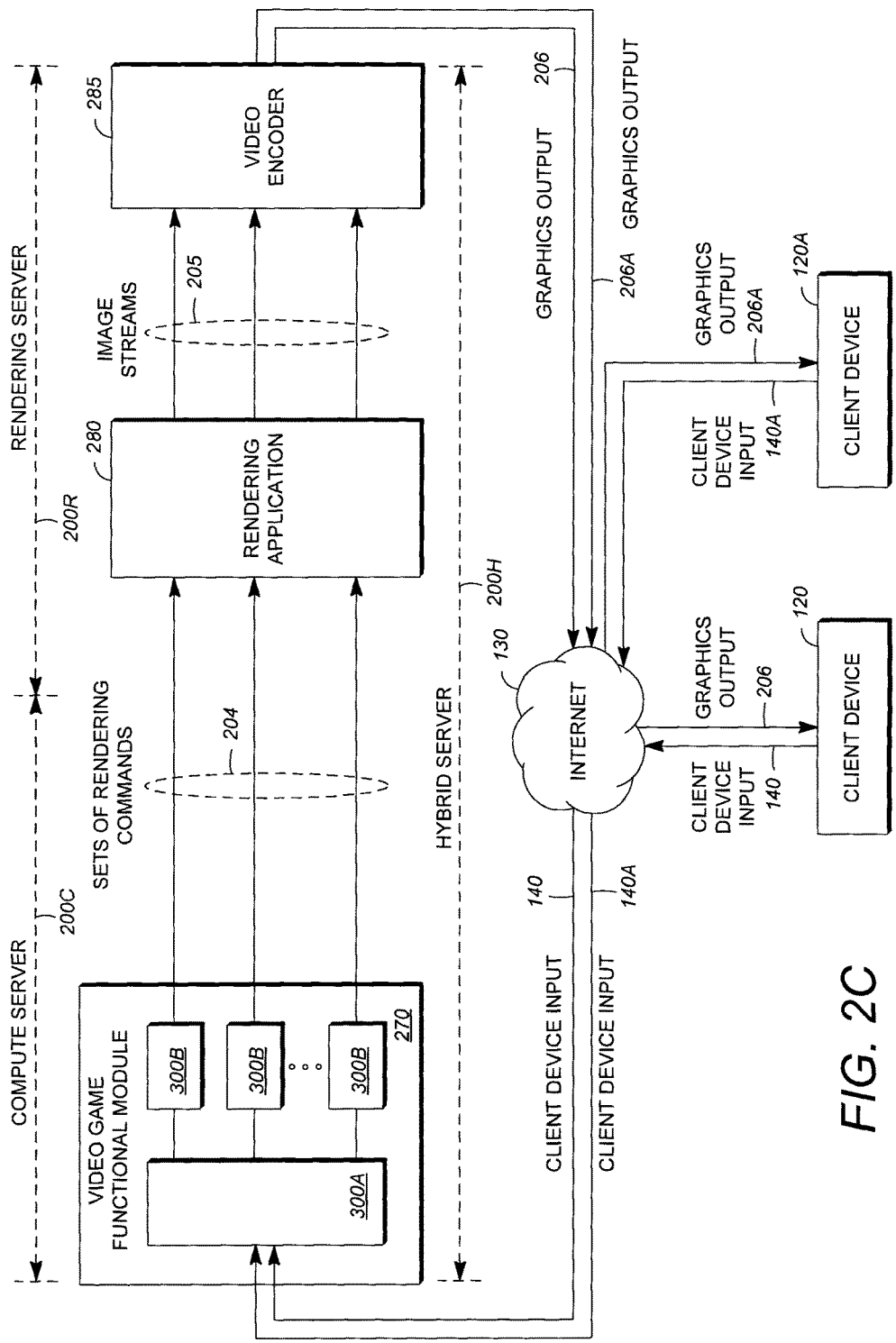
FIG. 2C is a block diagram showing various functional modules of the architecture of FIG. 1, which can be implemented by the physical components of FIG. 2A or 2B.

With additional reference now to FIG. 2C, the above-described physical components of the compute server 200C and the rendering server 200R (in FIG. 2A) and/or of the hybrid server 200H (in FIG. 2B) implement a set of functional modules, including a video game functional module 270, a rendering functional module 280 and a video encoder 285. According to the non-limiting embodiment of FIG. 2A, the video game functional module 270 is implemented by the compute server 200C, while the rendering functional module 280 and the video encoder 285 are implemented by the rendering server 200R. According to the non-limiting embodiment of FIG. 2B, the hybrid server 200H implements the video game functional module 270, the rendering functional module 280 and the video encoder 285.

The present example embodiment discusses a single video game functional module 270 for simplicity of illustration. However, it should be noted that in an actual implementation of the cloud gaming server system 100, many video game functional modules similar to the video game functional module 270 would be executed in parallel. Thus, the cloud gaming server system 100 could support multiple independent instantiations of the same video game, or multiple different video games, simultaneously. Also, it should be noted that the video games can be single-player video games or multi-player games of any type.

The video game functional module 270 may be implemented by certain physical components of the compute server 200C (in FIG. 2A) or of the hybrid server 200H (in FIG. 2B). Specifically, the video game functional module 270 can be encoded as computer-readable instructions that are executable by a CPU (such as the CPUs 220C, 222C in the compute server 200C or the CPUs 220H, 222H in the hybrid server 200H). The instructions can be tangibly stored in the RAM 230C (in the compute server 200C) of the RAM 230H (in the hybrid server 200H) or in another memory area, together with constants, variables and/or other data used by the video game functional module 270. In some embodiments, the video game functional module 270 may be executed within the environment of a virtual machine that may be supported by an operating system that is also being executed by a CPU (such as the CPUs 220C, 222C in the compute server 200C or the CPUs 220H, 222H in the hybrid server 200H).

The rendering functional module 280 may be implemented by certain physical components of the rendering server 200R (in FIG. 2A) or of the hybrid server 200H (in FIG. 2B). In an embodiment, the rendering functional module 280 may take up one or more GPUs (240R, 250R in FIG. 2A, 240H, 250H in FIG. 2B) and may or may not utilize CPU resources.

The video encoder 285 may be implemented by certain physical components of the rendering server 200R (in FIG. 2A) or of the hybrid server 200H (in FIG. 2B). Those skilled in the art will appreciate that there are various ways in which to implement the video encoder 285. In the embodiment of FIG. 2A, the video encoder 285 may be implemented by the CPUs 220R, 222R and/or by the GPUs 240R, 250R. In the embodiment of FIG. 2B, the video encoder 285 may be implemented by the CPUs 220H, 222H and/or by the GPUs 240H, 250H. In yet another embodiment, the video encoder 285 may be implemented by a separate encoder chip (not shown).

In operation, the video game functional module 270 produces the sets of rendering commands 204, based on received client device input. The received client device input may carry data (e.g., an address) identifying the video game functional module for which it is destined, as well as data identifying the user and/or client device from which it originates. Since the users of the client devices 120, 120A are participants in the video game (i.e., players or spectators), the received client device input includes the client device input 140, 140A received from the client devices 120, 120A.

Rendering commands refer to commands which can be used to instruct a specialized graphics processing unit (GPU) to produce a frame of video content or a sequence of frames of video content. Referring to FIG. 2C, the sets of rendering commands 204 define frames of video content that are ultimately produced by the rendering functional module 280. The images represented by these frames change as a function of responses to the client device input 140, 140A that are programmed into the video game functional module 270. For example, the video game functional module 270 may be programmed in such a way as to respond to certain specific stimuli to provide the user with an experience of progression (with future interaction being made different, more challenging or more exciting), while the response to certain other specific stimuli will provide the user with an experience of regression or termination. Although the instructions for the video game functional module 270 may be fixed in the form of a binary executable file, the client device input 140, 140A is unknown until the moment of interaction with a player who uses the corresponding client device 120, 120A. As a result, there can be a wide variety of possible outcomes, depending on the specific client device input that is provided. This interaction between players/spectators and the video game functional module 270 via the client devices 120, 120A can be referred to as "gameplay" or "playing a video game".

The rendering functional module 280 processes the plural sets of rendering commands 204 to create a plurality of video content streams 205. Generally, there will be one video content stream 205 per participant (or, equivalently, per client device). When performing rendering, data for one or more objects represented in three-dimensional space (e.g., physical objects) or two-dimensional space (e.g., text) may be loaded into a cache memory (not shown) of a particular GPU 240R, 250R, 240H, 250H. This data may be transformed by the GPU 240R, 250R, 240H, 250H into data representative of a two-dimensional image, which may be stored in the appropriate VRAM 246R, 256R, 246H, 256H. As such, the VRAM 246R, 256R, 246H, 256H may provide temporary storage of picture element (pixel) values for a game screen.

The video encoder 285 compresses and encodes the video content stream 205 into streams of compressed video frames. The resultant streams of compressed video frames, referred to as graphics output streams, are produced on a per-client-device basis. In the present example embodiment, the video encoder 285 produces graphics output stream 206 for client device 120 and graphics output stream 206A for client device 120A. Additional functional modules may be provided for formatting the video frames into packets so that they can be transmitted over the Internet 130.

V. Generation of Rendering Commands

Generation of rendering commands by the video game functional module 270 is now described in greater detail with reference to FIGS. 2C, 3A and 3B. Specifically, execution of the video game functional module 270 involves several processes, including a main game process 300A and one or more graphics control processes 300B, which are described herein below in greater detail.

Main Game Process

A first process, referred to as the main game process, is described with reference to FIG. 3A. The main game process 300A executes continually. As part of the main game process 300A, there is provided an action 310A, during which client device input may be received. If the video game is a single-player video game without the possibility of spectating, then client device input (e.g., client device input 140) from a single client device (e.g., client device 120) is received as part of action 310A. If the video game is a multi-player video game or is a single-player video game with the possibility of spectating, then the client device input (e.g., the client device input 140 and 140A) from one or more client devices (e.g., the client devices 120 and 120A) may be received as part of action 310A.

By way of non-limiting example, the input from a given client device may convey that the user of the given client device wishes to cause a character under his or her control to move, jump, kick, turn, swing, pull, grab, etc. Alternatively or in addition, the input from the given client device may convey a menu selection made by the user of the given client device in order to change one or more audio, video or gameplay settings, to load/save a game or to create or join a network session. Alternatively or in addition, the input from the given client device may convey that the user of the given client device wishes to select a particular camera view (e.g., first-person or third-person) or reposition his or her viewpoint within the virtual world.

At action 320A, the game state may be updated based at least in part on the client device input received at action 310A and other parameters. Updating the game state may involve the following actions:

Firstly, updating the game state may involve updating certain properties of the participants (player or spectator) associated with the client devices from which the client device input may have been received. These properties may be stored in the participant database 10. Examples of participant properties that may be maintained in the participant database 10 and updated at action 320A can include a camera view selection (e.g., $1^{st}$ person, $3^{rd}$ person), a mode of play, a selected audio or video setting, a skill level, a customer grade (e.g., guest, premium, etc.).

Secondly, updating the game state may involve updating the attributes of certain objects in the virtual world based on an interpretation of the client device input. The objects whose attributes are to be updated may in some cases be represented by two- or three-dimensional models and may include playing characters, non-playing characters and other objects. In the case of a playing character, attributes that can be updated may include the object's position, strength, weapons/armor, lifetime left, special powers, speed/direction (velocity), animation, visual effects, energy, ammunition, etc. In the case of other objects (such as background, vegetation, buildings, vehicles, score board, etc.), attributes that can be updated may include the object's position, velocity, animation, damage/health, visual effects, textual content, etc.

It should be appreciated that parameters other than client device input can influence the above properties (of participants) and attributes (of virtual world objects). For example, various timers (such as elapsed time, time since a particular event, virtual time of day, total number of players, a participant's geographic location, etc.) can have an effect on various aspects of the game state.

Once the game state has been updated further to execution of action 320A, the main game process 300A returns to action 310A, whereupon new client device input received since the last pass through the main game process is gathered and processed.

Graphics Control Process

A second process, referred to as the graphics control process, is now described with reference to FIG. 3B. The graphics control process 300B may execute continually, and there may be a plurality separate graphics control processes 300B, each of which results in a respective one of the sets of rendering commands 204. In the case of a single-player video game without the possibility of spectating, there is only one player and therefore only one resulting set of rendering commands 204, and thus the graphics control process 300B may execute as an extension of the main game process 300A described above. In the case of a multi-player video game, multiple distinct sets of rendering commands need to be generated for the multiple players, and therefore multiple graphics control processes 300B may execute in parallel. In the case of a single-player game with the possibility of spectating, there may again be only a single set of rendering commands 204, and therefore a single graphics control process 300b may execute in the video game functional module 270, but the resulting video content stream may be duplicated for the spectators by the rendering functional module 280. Of course, these are only examples of implementation and are not to be taken as limiting.

At action 310B of the graphics control process 300B for a given participant requiring a distinct video content stream, the video game functional module 270 determines the objects to be rendered for the given participant. This action can include identifying the following types of objects:

Firstly, this action can include identifying those objects from the virtual world that are in the "game screen rendering range" (also known as a "scene") for the given participant. The game screen rendering range includes the portion of the virtual world that would be "visible" from the perspective of the given participant's camera. This depends on the position and orientation of that camera relative to the objects in the virtual world. In a non-limiting example of implementation of action 310B, a frustum can be applied to the virtual world, and the objects within that frustum are retained or marked. The frustum has an apex which is situated at the location of the given participant's camera and has a directionality also defined by the directionality of that camera.

Secondly, this action can include identifying additional objects that do not appear in the virtual world, but which nevertheless are to be rendered for the given participant. For example, these additional objects may include textual messages, graphical warnings and dashboard indicators, to name a few non-limiting possibilities.

At action 320B, the video game functional module 270 generates a set of commands for transforming rendering into graphics (video content) the objects that were identified at action 310B. Rendering may refer to the transformation of 3-D or 2-D coordinates of an object or group of objects into data representative of a displayable image, in accordance with the viewing perspective and prevailing lighting conditions. This can be achieved using any number of different algorithms and techniques, for example as described in "Computer Graphics and Geometric Modelling: Implementation & Algorithms", Max K. Agoston, Springer-Verlag London Limited, 2005, hereby incorporated by reference herein.

At action 330B, the rendering commands generated at action 320B are output to the rendering functional module 280. This may involve packetizing the generated rendering commands into a set of rendering commands 204 that is sent to the rendering functional module 280.

Those skilled in the art will appreciate that multiple instantiations of the graphics control process 300B described above may be executed, resulting in multiple sets of rendering commands 204.

VI. Generation of Graphics Output

The rendering functional module 280 interprets the plural sets of rendering commands 204 and produces a plural set of video content streams 205, one for each participating client device. Rendering may be achieved by the GPUs 240R, 250R, 240H, 250H under control of the CPUs 220R, 222R (in FIG. 2A) or 220H, 222H (in FIG. 2B). The rate at which frames of video content are produced for a participating client device may be referred to as the frame rate.

In an embodiment where there are N participants, there may be N sets of rendering commands 204 (one for each participant) and also N video content streams 205 (one for each participant). In that case, rendering functionality is not shared among the participants. However, the N video content streams 205 may also be created from M sets of rendering commands 204 (where M<N), such that fewer sets of rendering commands need to be processed by the rendering functional module 280. In that case, the rendering functional unit 280 may perform sharing or duplication in order to generate a larger number of video content streams 205 from a smaller number of sets of rendering commands 204. Such sharing or duplication may be prevalent when multiple participants (e.g., spectators) desire to view the same camera perspective. Thus, the rendering functional module 280 may perform functions such as duplicating a created video content stream for one or more spectators.

Next, the video content in each of the video content streams 205 are encoded by the video encoder 285, resulting in a sequence of encoded video content associated with each client device, referred to as a graphics output stream. In the example embodiments of FIGS. 2A-2C, the sequence of encoded video content destined for client device 120 is referred to as graphics output stream 206, while the sequence of encoded video content destined for client device 120A is referred to as graphics output stream 206A.

The video encoder 285 can be a device (or set of computer-readable instructions) that enables or carries out or defines a video compression or decompression algorithm for digital video. Video compression transforms an original stream of digital image data (expressed in terms of pixel locations, color values, etc.) into an output stream of digital image data that conveys substantially the same information but using fewer bits. Any suitable compression algorithm may be used. In addition to data compression, the encoding process used to encode a particular frame of video content may or may not apply cryptographic encryption.

The graphics output streams 206, 206A created in the above manner are sent over the Internet 130 to the respective client devices. By way of non-limiting example, the graphics output streams may be segmented and formatted into packets, each having a header and a payload. The header of a packet containing video content for a given participant may include a network address of the client device associated with the given participant, while the payload may include the video content, in whole or in part. In a non-limiting embodiment, the identity and/or version of the compression algorithm used to encode certain video content may be encoded in the content of one or more packets that convey that video content. Other methods of transmitting the encoded video content will occur to those of skill in the art.

While the present description focuses on the rendering of video content representative of individual 2-D images, the present invention does not exclude the possibility of rendering video content representative of multiple 2-D images per frame to create a 3-D effect.

VII. Game Screen Reproduction at Client Device

Figure 4A:
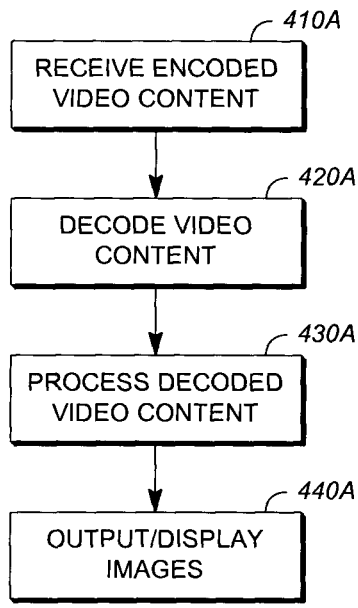
FIGS. 4A and 4B are flowcharts showing operation of a client device to process received video and audio, respectively, in accordance with non-limiting embodiments of the present invention.

Reference is now made to FIG. 4A, which shows operation of the client device associated with a given participant, which may be client device 120 or client device 120A, by way of non-limiting example.

At action 410A, encoded frames of video content (in one of the graphics output streams 206, 206A) is received over the Internet 130 from the rendering server 200R (FIG. 2A) or from the hybrid server 200H (FIG. 2B), depending on the embodiment.

At action 420A, the encoded frames of video content are decoded in accordance with the decompression algorithm that is complementary to the compression algorithm used in the encoding process. In a non-limiting embodiment, the identity or version of the compression algorithm used to encode the video content may be known in advance. In other embodiments, the identity or version of the compression algorithm used to encode the video content may accompany the video content itself.

At action 430A, the (decoded) frames of video content are processed. This can include placing the decoded frames of video content in a buffer, performing error correction, reordering and/or combining the data in multiple successive frames, alpha blending, interpolating portions of missing data, and so on. The result can be video content representative of a final image to be presented to the user on a per-frame basis.

At action 440A, the final image is output via the output mechanism of the client device. For example, a composite video frame can be displayed on the display of the client device.

VIII. Audio Generation

A third process, referred to as the audio generation process, is now described with reference to FIG. 3C. The audio generation process executes continually for each participant requiring a distinct audio stream. In one embodiment, the audio generation process may execute independently of the graphics control process 300B. In another embodiment, execution of the audio generation process and the graphics control process may be coordinated.

At action 310C, the video game functional module 270 determines the sounds to be produced. Specifically, this action can include identifying those sounds associated with objects in the virtual world that dominate the acoustic landscape, due to their volume (loudness) and/or proximity to the participant within the virtual world.

At action 320C, the video game functional module 270 generates an audio segment. The duration of the audio segment may span the duration of a video frame, although in some embodiments, audio segments may be generated less frequently than video frames, while in other embodiments, audio segments may be generated more frequently than video frames.

At action 330C, the audio segment is encoded, e.g., by an audio encoder, resulting in an encoded audio segment. The audio encoder can be a device (or set of instructions) that enables or carries out or defines an audio compression or decompression algorithm. Audio compression transforms an original stream of digital audio (expressed as a sound wave changing in amplitude and phase over time) into an output stream of digital audio data that conveys substantially the same information but using fewer bits. Any suitable compression algorithm may be used. In addition to audio compression, the encoding process used to encode a particular audio segment may or may not apply cryptographic encryption.

It should be appreciated that in some embodiments, the audio segments may be generated by specialized hardware (e.g., a sound card) in either the compute server 200C (FIG. 2A) or the hybrid server 200H (FIG. 2B). In an alternative embodiment that may be applicable to the distributed arrangement of FIG. 2A, the audio segment may be parametrized into speech parameters (e.g., LPC parameters) by the video game functional module 270, and the speech parameters can be redistributed to the destination client device (e.g., client device 120 or client device 120A) by the rendering server 200R.

The encoded audio created in the above manner is sent over the Internet 130. By way of non-limiting example, the encoded audio input may be broken down and formatted into packets, each having a header and a payload. The header may carry an address of a client device associated with the participant for whom the audio generation process is being executed, while the payload may include the encoded audio. In a non-limiting embodiment, the identity and/or version of the compression algorithm used to encode a given audio segment may be encoded in the content of one or more packets that convey the given segment. Other methods of transmitting the encoded audio will occur to those of skill in the art.

Figure 4B:
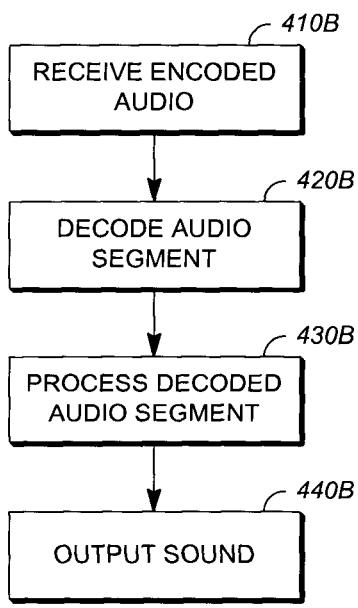

Reference is now made to FIG. 4B, which shows operation of the client device associated with a given participant, which may be client device 120 or client device 120A, by way of non-limiting example.

At action 410B, an encoded audio segment is received from the compute server 200C, the rendering server 200R or the hybrid server 200H (depending on the embodiment). At action 420B, the encoded audio is decoded in accordance with the decompression algorithm that is complementary to the compression algorithm used in the encoding process. In a non-limiting embodiment, the identity or version of the compression algorithm used to encode the audio segment may be specified in the content of one or more packets that convey the audio segment.

At action 430B, the (decoded) audio segments are processed. This can include placing the decoded audio segments in a buffer, performing error correction, combining multiple successive waveforms, and so on. The result can be a final sound to be presented to the user on a per-frame basis.

At action 440B, the final generated sound is output via the output mechanism of the client device. For example, the sound is played through a sound card or loudspeaker of the client device.

IX. Specific Description of Non-Limiting Embodiments

A more detailed description of certain non-limiting embodiments of the present invention is now provided.

Figure 5A:
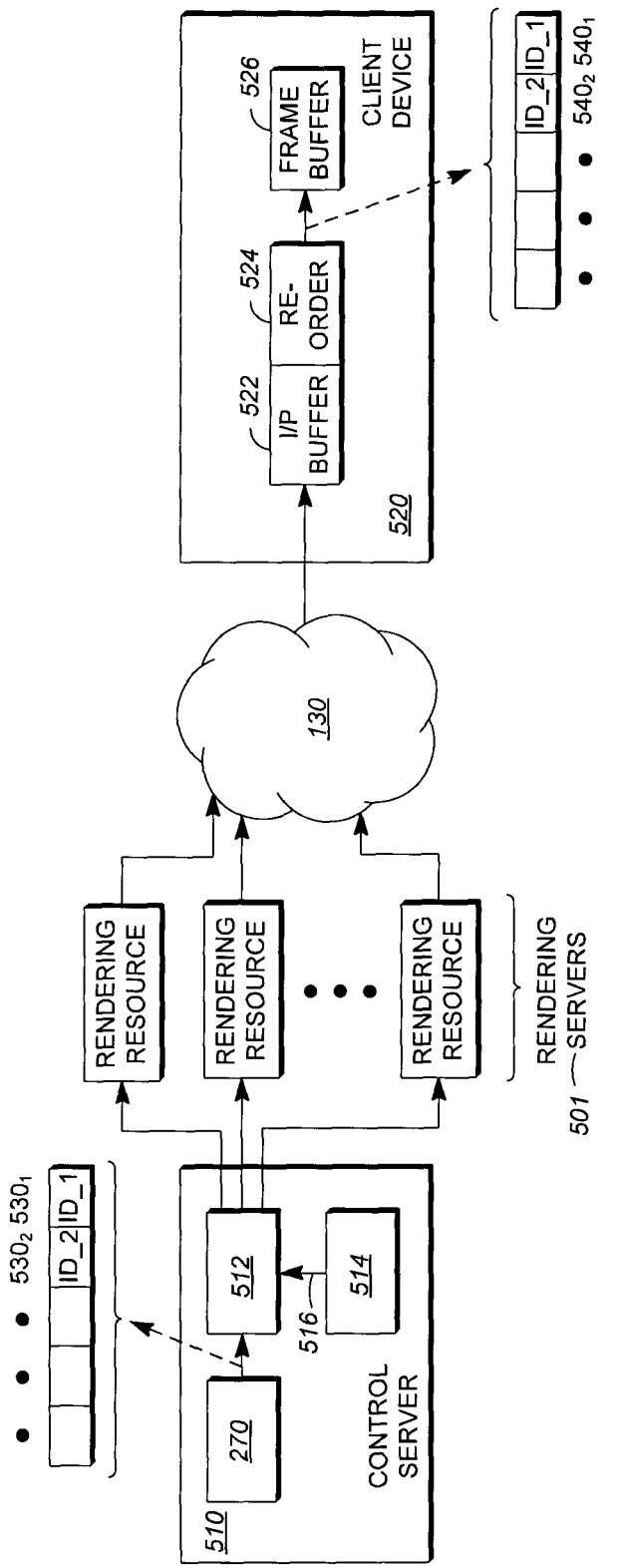
FIG. 5A is a block diagram showing the use of multiple rendering resources in a distributed rendering environment, according to a non-limiting embodiment of the present invention.

Reference is made to FIG. 5A, in which there is shown a control server 510, a plurality of rendering resources 501 and a client device 520. The rendering resources 501 receive sets of rendering commands from the control server 510 and produce video content that is encoded and sent to the client device 520 over a network such as the Internet 130. Accordingly, one or more of the rendering resources 501 may generally resemble the rendering server 200R in FIG. 2A, and the client device 520 could be any of the aforementioned client devices 120, 120A. The rendering resources 501 may be geographically dispersed, such as amongst a plurality of buildings or cities, for example. Alternatively, two or more of the rendering resources 501 may be situated in the same physical location, such as in the same building or city.

In a non-limiting embodiment, the design of the control server 510 can be based upon the compute server 210C in FIG. 2A. Therefore, the control server 510 can be a game control server and its software configuration can include the aforementioned video game functional module 270, which generates sets of rendering commands (or "rendering command sets"). A rendering command set can be interpreted by a rendering resource (e.g., a server reachable over the Internet), resulting in the creation of one or more frames of video content. For the purposes of the present illustrated example, the rendering command sets generated by the video game functional module 270 are denoted $530_1$, $530_2$, etc. Also, in the present illustrated example, each of the rendering command sets $530_1$, $530_2$, etc. corresponds to one frame of video content (respectively denoted $540_1$, $540_2$, etc.) that is ultimately created by the rendering resources 501. However, this one-to-one correspondence is not to be understood as a limitation of the present invention since, generally speaking, a rendering command set may correspond to one or more ultimately created frames of video content.

The control server 510 includes suitable hardware, software and/or control logic for implementing an output controller 512, which intercepts the rendering command sets $530_1$, $530_2$, etc. produced by the video game functional module 270 and determines where to send each rendering command set. Stated differently, at a particular moment in time, each of the rendering command sets $530_1$, $530_2$, etc. is sent to one of the rendering resources 501 that has been designated as an "allocated" rendering resource at that moment in time. An identifier of the "allocated rendering resource", which varies over time, can be provided to the output controller 512 by a rendering resource allocation module 514. Thus, the functionality of the output controller 512, for a given client device (such as the client device 520), may be similar to that of a demultiplexer having one input and a plurality of outputs, and being controlled by the rendering resource allocation module 514.

The rendering resource allocation module 514 may be implemented using the hardware/software/control logic resources of the control server 510. From a functional point of view, the rendering resource allocation module 514 monitors one or more parameters and makes a rendering resource reallocation decision based upon the monitored parameter(s). The decision to change which rendering resource is designated as the allocated rendering resource can be made on a per-participant (or per-client-device) basis, that is to say, there may be a list of participant/client devices stored in memory, each participant/client device associated with a particular rendering resource that is designated as the allocated rendering resource for that participant/client device at that moment in time. The identity of the allocated rendering resource for a given client such as the client device 520 may change dynamically (i.e., over time) in order to accommodate a variety of operational conditions and constraints.

Once a decision to change which rendering resource is designated as the allocated rendering resource for the client device 520 has been made by the rendering resource allocation module 514, this decision may be communicated directly to the output controller 512 in the form of a control signal 516. The control signal 516 may specifically identify the newly allocated rendering resource. The identifier of the allocated rendering resource can be encoded as that respective server's IP address, for example. Alternatively, the decision could be communicated in an indirect fashion. For example, the identifier of the currently allocated rendering resource (e.g., a server's IP address or other identifier) may be stored at the control server 510 in a memory location (not shown) that is at least readable by the output controller 512 and at least writable by the rendering resource allocation module 514. The output controller 512 may be configured to poll this memory location on a regular basis. In such a scenario, the rendering resource allocation module 514 may simply write the identifier of the newly allocated rendering resource to the aforementioned memory location, and this fresh information will be available to the output controller 512 when it reads from the memory location. Other mechanisms for conveying the rendering resource reallocation decision to the output controller 512 are of course possible.

Figure 5B:
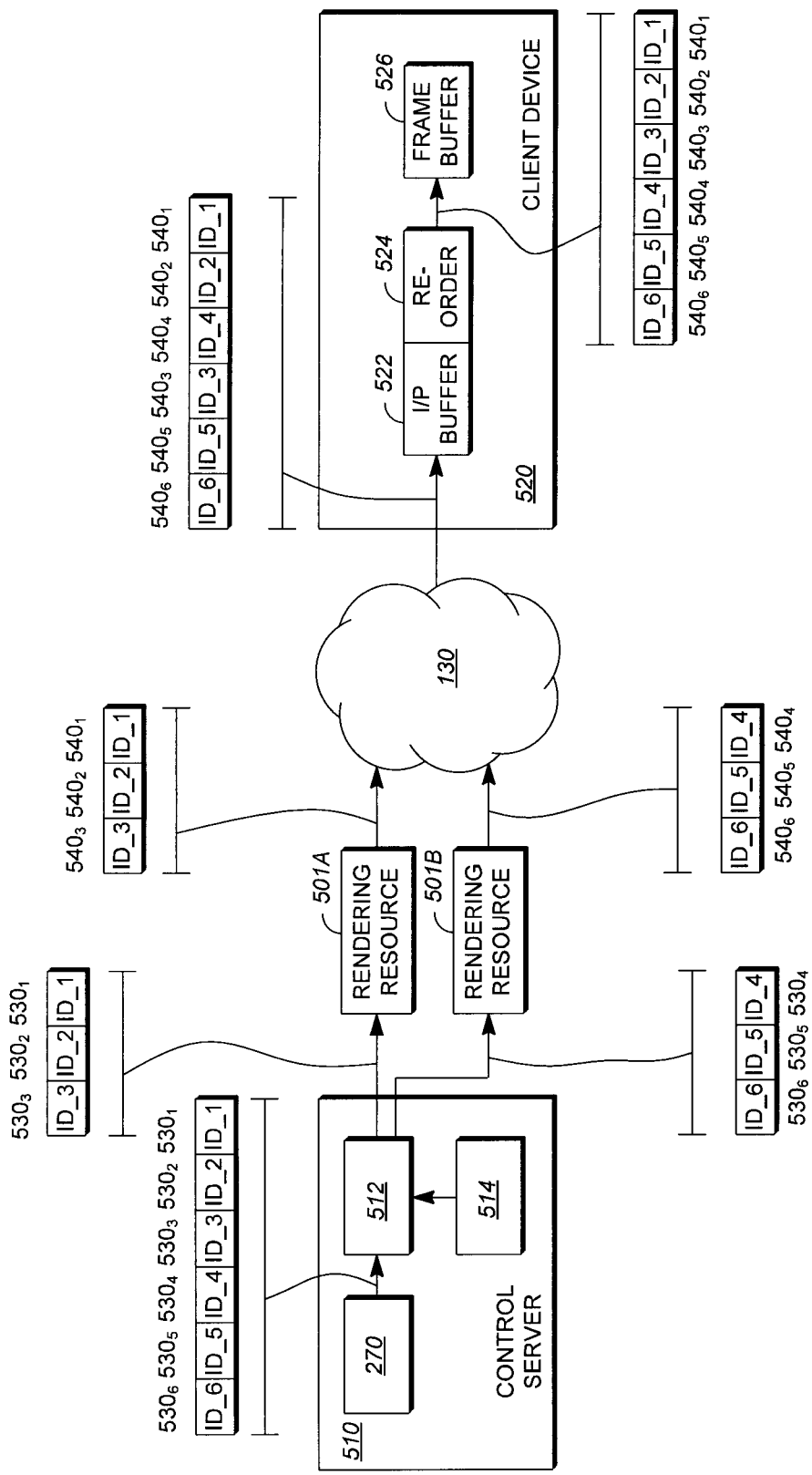
FIG. 5B shows more detail regarding the sequencing of rendering command sets and generated frames of video content, resulting from dynamic rendering resource allocation.

In operation, the video game functional module 270 generates a sequence of rendering command sets which, for the purposes of the present example illustrated in FIG. 5B, is assumed to include rendering command sets $530_1$, $530_2$, $530_3$, $530_4$, $530_5$ and $530_6$, in that order. While only six rendering command sets are shown, this is not to be understood as a limitation of the present invention. Also, let it be assumed that there are two rendering resources 501A and 501B in the cloud gaming system although it should be understood that there is no particular limit on the number of rendering resources 501 that could be employed in a practical realization of the present invention.

Now, let it further be assumed that the allocated rendering resource for the client device 520 at the time of sending out rendering command set $530_1$ is rendering resource 501A. The identity of the allocated rendering resource is known to the output controller 512, which directs rendering command set $530_1$ to rendering resource 501A. Let it also be assumed that this situation persists for some time, allowing rendering command sets $530_2$ and $530_3$ to be similarly sent to rendering resource 501A. Rendering resource 501A transforms the rendering command sets $530_1$, $530_2$ and $530_3$ into respective frames of video content $540_1$, $540_2$ and $540_3$. Frames $540_1$, $540_2$ and $540_3$ are sent to the client device 520 after being encoded and/or compressed by rendering resource 501A. Although in this example, each rendering command set corresponds to a single respective frame of video content, this one-to-one correspondence is not a limitation, as it is possible for a given rendering command set to result in the creation of multiple frames of video content.

Assume now that the rendering resource allocation module 514 decides to change which rendering resource is the allocated rendering resource for the client device 520, so that it designates rendering resource 501B as the allocated rendering resource for client device 520. This decision to change the identity of the allocated rendering resource for the client device 520 may be the result of a rendering resource allocation algorithm implemented by a logic circuit or stored program. From this point on, the output controller 512 begins sending rendering command sets to the newly allocated rendering resource, namely rendering resource 501B. Accordingly, rendering command sets $530_4$, $530_5$ and $530_6$ are sent to rendering resource 501B, which transforms the rendering command sets $530_4$, $530_5$ and $530_6$ into respective frames of video content $540_4$, $540_5$ and $540_6$. frames of video content $540_4$, $540_5$ and $540_6$ may be encoded and/or compressed, this time by rendering resource 501B, before being sent to the client device 520.

For its part, the client device 520 receives frames of video content from each of the two rendering resources 510A, 501B, but at different times corresponding generally to the times during which the given rendering resource (either 501A or 510B) was the allocated rendering resource for the client device 520. Specifically, the client device 520 receives frames of video content $540_1$, $540_2$ and $540_3$ from rendering resource 501A (which were sent during the time period when rendering resource 501A was the allocated rendering resource for the client device 520). Also, the client device 520 receives frames of video content $540_4$, $540_5$ and $540_6$ from rendering resource 501B (which were sent during the time period when rendering resource 501B was the allocated rendering resource for the client device 520).

Upon receipt at the client device 520, the received frames of video content may be placed into a buffer 522 and decoded. Since there is no guarantee that, for example, frame $540_3$ will be received before frame $540_4$, it may be desirable to implement a reordering functional unit 524, which is responsible for ensuring that the images subsequently displayed by the client device 520 are displayed in the correct order. As such, the buffer 522 and the reordering functional unit 524 can implement action 430A of FIG. 4A that was described previously. Once the received frames of video content $540_1$, $540_2$, $540_3$, $540_4$, $540_5$ and $540_6$ have been reordered (if necessary) at the client device 520, they may be placed into a frame buffer 526. The frame buffer 526 can be the source of the images that are to be displayed on the display of the client device 520 in the context of action 440A of FIG. 4A.

The order of the rendering command sets $530_1$, $530_2$, $530_3$, $530_4$, $530_5$ and $530_6$ (and therefore the order of the corresponding frames of video content $540_1$, $540_2$, $540_3$, $540_4$, $540_5$ and $540_6$) may be encoded in the form of a sequence identifier that is embedded in or otherwise sent by the output controller 512 with each of the rendering command sets $530_1$, $530_2$, $530_3$, $530_4$, $530_5$ and $530_6$ and is propagated to the client device 520 by the rendering resources 510A, 501B. By way of illustration, in FIG. 5B, sequence identifiers ID_1, ID_2, ID_3, ID_4, ID_5 and ID_6 are sent by the output controller 512 with rendering command sets $530_1$, $530_2$, $530_3$, $530_4$, $530_5$ and $530_6$, respectively. These sequence identifiers are re-transmitted with frames of video content $540_1$, $540_2$, $540_3$, $540_4$, $540_5$ and $540_6$, respectively, regardless of which rendering resource is responsible for generating a particular frame. Of course, the skilled person will realize that there are other techniques to achieve proper ordering.

It will be observed from the above description that the responsibility for generating frames of video content is transferred among the rendering resources 501 in a dynamic fashion.

In some embodiments, it may be useful to alert the client device 520 as to the identifier of any newly allocated rendering resource from which it can expect to receive frames of video content, as well as the sequence identifier of the first frame that is expected to be received from the newly allocated rendering resource. To accomplish this in the aforementioned example of operation, it is possible for the output controller 512 to precede the transmission of first rendering command set that is under the responsibility of the newly allocated rendering resource by a message that is sent to the client device 520.

Figure 6A:
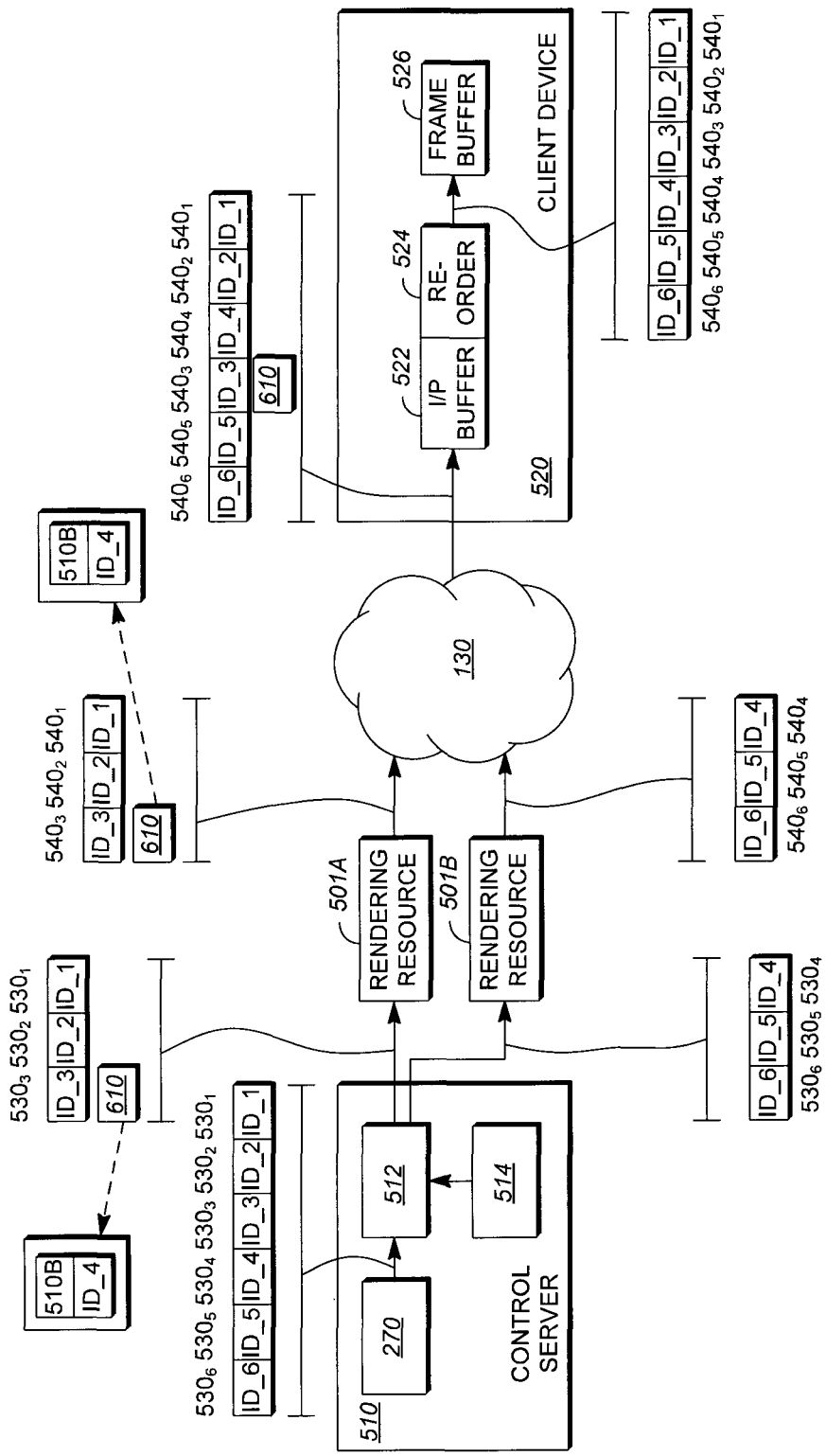
FIGS. 6A and 6B show variants in which an alert message is transmitted to the client device to signal a change in the identity of the rendering resource designated as the allocated rendering resource for the client device.

FIG. 6A shows the situation in which the output controller 512 inserts an alert 610 into a rendering command set sent to rendering resource 501A (in this case, rendering command set $530_3$). The alert 610 includes the identifier of rendering resource 501B and sequence identifier ID_4. Generally speaking, the alert could include the sequence identifiers of one or more rendering command sets scheduled to be sent to the newly allocated rendering resource. Rendering resource 501A propagates the alert 610 to the client device 520, which will consequently know that subsequent frames, beginning with the frame having sequence identifier ID_4 (namely, frame $540_4$), will be received from rendering resource 501B.

Figure 6B:
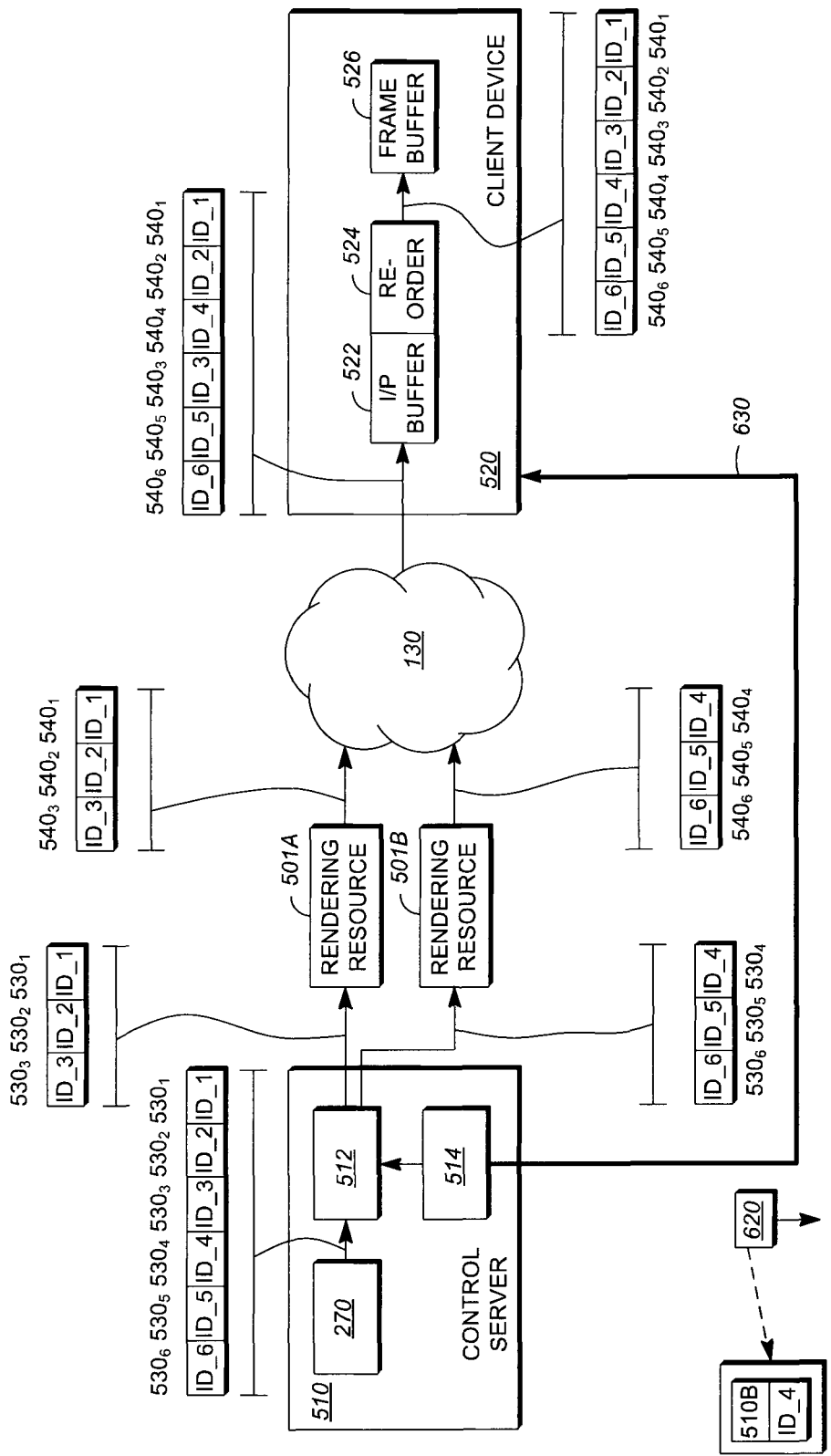

FIG. 6B shows the situation in which the same information as in the aforementioned alert 610 is sent as an out-of-band message 620 over a control link 630 established over the Internet 130 between the rendering resource allocation module 514 and the client device 520.

Figure 6C:
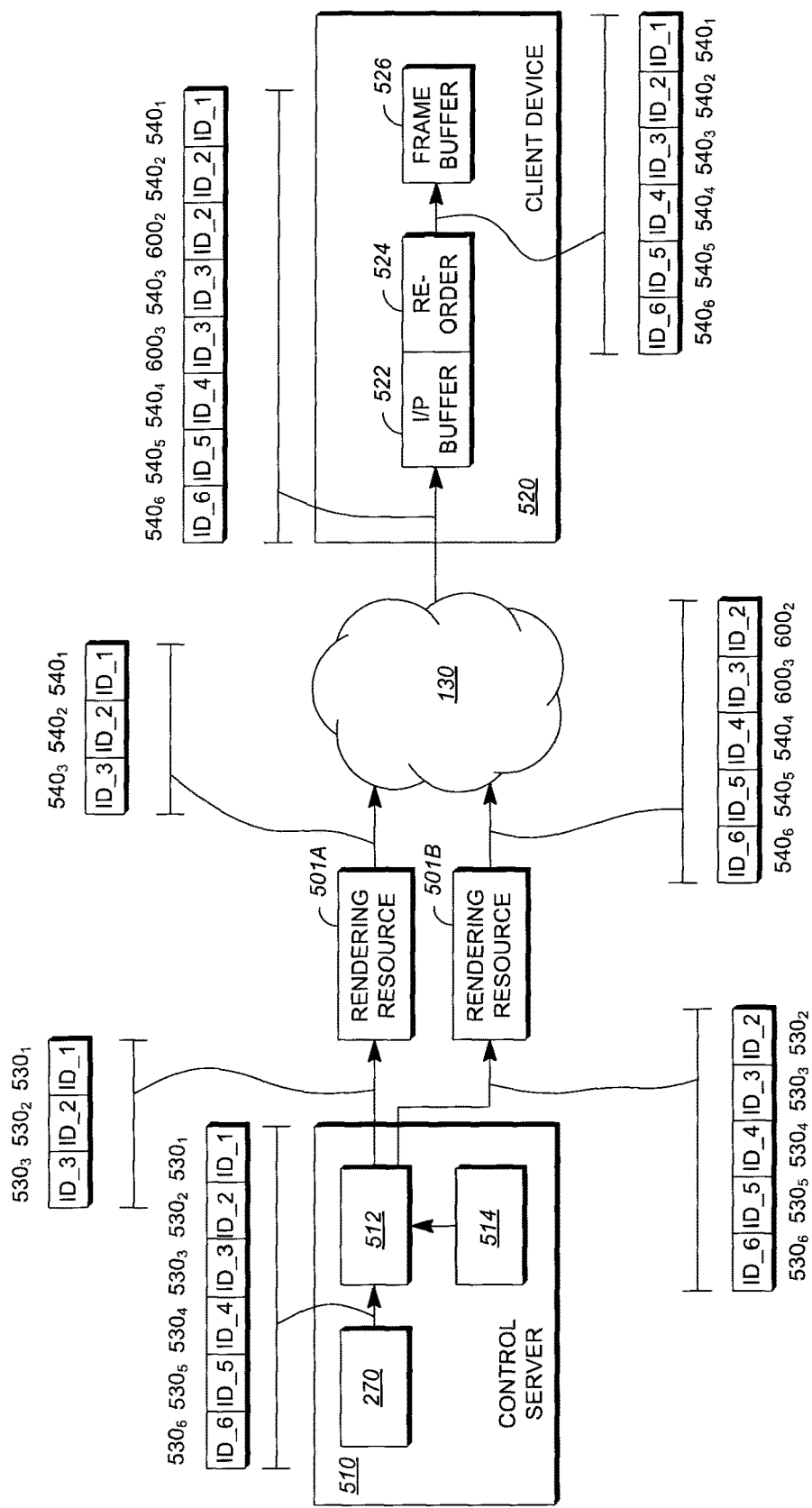
FIGS. 6C and 6D show variants in which duplicate rendering command sets produce duplicate frames of video content, in order to smooth the transition over to a newly allocated rendering resource.

FIG. 6C shows another way of carrying out the transition, namely by having the output controller 512 duplicately transmit rendering command sets to both rendering resources 501A, 501B, starting with one or more rendering command sets prior to changing the identity of the allocated rendering resource. In this case, rendering command set $530_1$ is shown as being sent only to rendering resource 501A, while the next two rendering command sets $530_2$ and $530_3$ are shown as being sent to both the formerly allocated rendering resource (rendering resource 501A) and the newly allocated rendering resource (rendering resource 501B). Thereafter, rendering command sets $530_4$, $530_5$ and $530_6$ are, as before, only sent to rendering resource 501B. The rendering resources 501A, 501B respond by generating corresponding frames of video content, resulting in some duplicate frames (namely, frames $600_2$ and $600_3$ carrying sequence identifiers ID_2 and ID_3) being sent to the client device 520. At the client device 520, the reordering functional unit 524 can be equipped with functionality to remove duplicate video content from the input buffer 522.

Figure 6D:
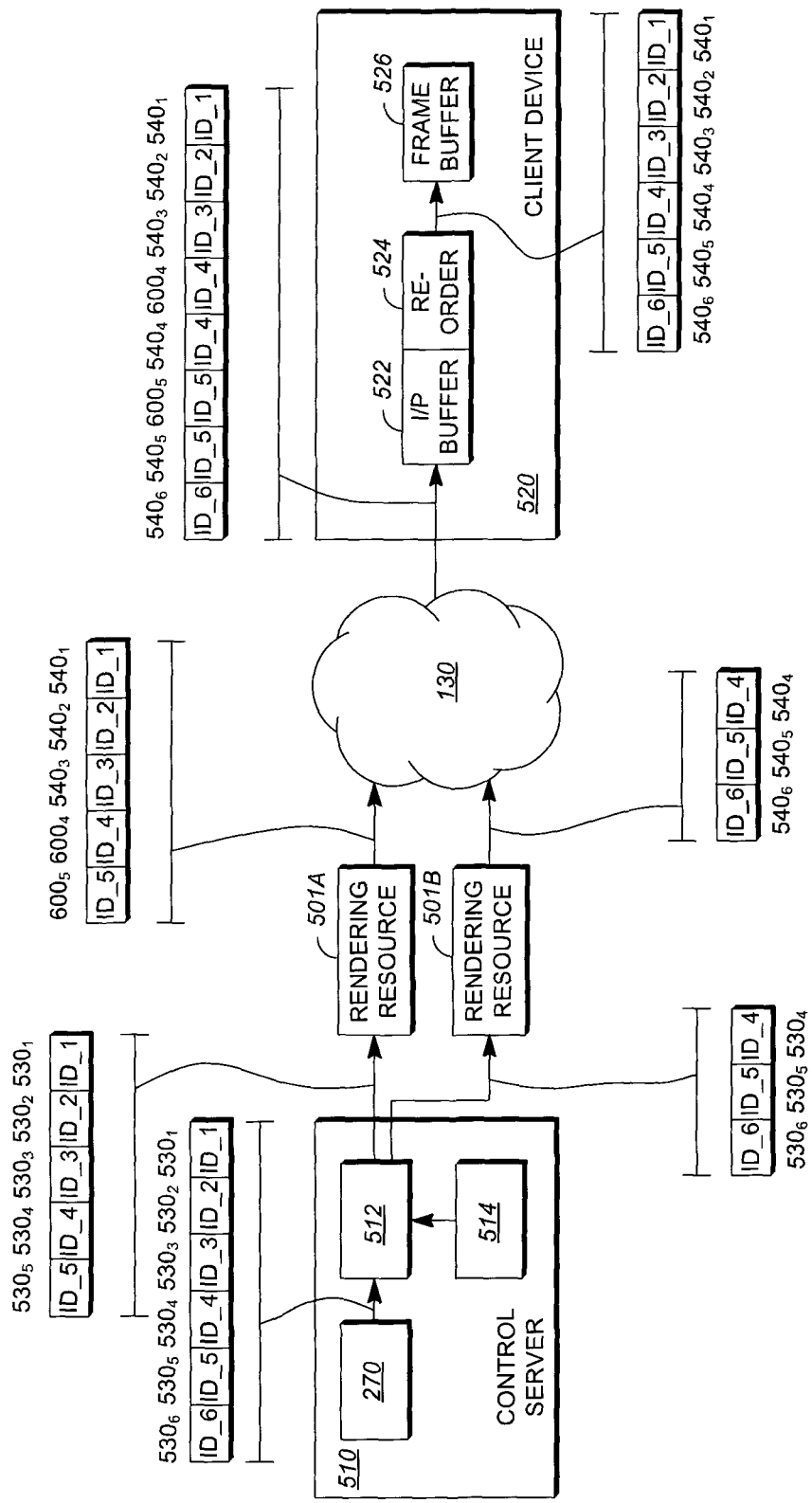

Conversely, it is also within the scope of the present invention to carry out the transition by having the output controller 512 duplicately transmit rendering command sets to both rendering resources 510A, 501B, starting with one or more rendering command sets after (rather than prior to) changing the identity of the allocated rendering resource. This is shown in FIG. 6D, where rendering command sets $530_1$, $530_2$ and $530_3$ are shown as being sent only to rendering resource 501A, while rendering command sets $530_4$ and $530_5$ are shown as being sent to both the formerly allocated rendering resource (rendering resource 501A) and the newly allocated rendering resource (rendering resource 501B). Finally, rendering command set $530_6$ is only sent to rendering resource 501B. The rendering resources 501A, 501B respond by generating corresponding frames of video content, resulting in some duplicate frames (namely, frames $600_4$ and $600_5$ carrying sequence identifiers ID_4 and ID_5) being sent to the client device 520. At the client device 520, the reordering functional unit 524 can be equipped with functionality to remove duplicate frames from the input buffer 522.

In another embodiment, each of the rendering resources 501A, 501B may add its own signature when transmitting a particular frame to the client device 520 in order to allow the client device 520 to recognize which rendering resource has sent the particular frame when it is received.

Still other techniques for transitioning from a formerly allocated rendering resource to a newly allocated rendering resource will be understood by those of skill in the art to be within the scope of the present invention.

Rendering Resource Allocation Algorithm

The rendering resource allocation module 514 implements a rendering resource allocation algorithm in order to make a rendering resource reallocation decision, which is a decision as to the appropriate moment for changing the identity of the allocated rendering resource from the currently allocated rendering resource to a newly allocated rendering resource. This decision, which is carried out on a per-client-device basis, could be based on variety of conditions.

A first example of a condition used for making a rendering resource reallocation decision may be related to the transmission distance between the client device 520 and the currently allocated rendering resource. Specifically, consider that the transmission distance between the client device 520 and the currently allocated rendering resource (e.g., rendering resource 501A) is being monitored, along with the transmission distance between the client device 520 and one or more other rendering resources (e.g., rendering resource 501B). In this example, the condition leading to reallocation may be deemed to be satisfied when the transmission distance between the client device 520 and the currently allocated rendering resource (e.g., rendering resource 501A) exceeds the transmission distance between the client device and another rendering resource (e.g., rendering resource 501B). This other rendering resource (e.g., rendering resource 501B) then becomes the newly allocated rendering resource for the client device 520.

According to the first example mentioned above, consider a player who is in a vehicle (such as a car, train or plane) and using a mobile device's wireless connection (e.g., over cellular/WiMax/WiFi). Consider also that the player is moving away from the currently allocated rendering resource (e.g., rendering resource 501A) and finds himself/herself approaching a neighboring server (e.g., rendering resource 501B) that could be used for creating and streaming frames of video content. As some point, the communication latency between the mobile device and the neighboring server (e.g., rendering resource 501B) could be better (i.e., smaller) than the one being experienced using the currently allocated rendering resource (e.g., rendering resource 501A). This could warrant changing to the neighboring server (e.g., rendering resource 501B) as the newly allocated rendering resource.

It is noted that the change in the identity of the allocated rendering resource for the client device 520 may occur independently of the client device's wireless connection. That is to say, the same wireless connection may be preserved, but the source of the frames of video content over that connection changes dynamically. Conversely, the wireless connection may change for a variety of reasons, but this does not imply that the identity of the allocated rendering resource has to change. That is to say, the decision to transition between rendering resources may be independent of the decision to hand off the wireless connection.

Similarly, the change in which rendering resource is the allocated rendering resource for the client device 520 may occur independently of the client device's Internet connection. That is to say, the same Internet connection may be continuously maintained while the source of the frames of video content over that Internet connection changes from rendering resource 501A to rendering resource 501B. Alternatively, different Internet connections can be established over which frames of video content are received from different sources.

A second example of a condition used for making a rendering resource reallocation decision may be related to the measured communication latency between the client device 520 and the currently allocated rendering resource. Specifically, consider that the communication latency between the client device 520 and the currently allocated rendering resource (e.g., rendering resource 501A) is being monitored, along with the communication latency between the client device 520 and one or more other rendering resources (e.g., rendering resource 501B). In this example, the condition leading to reallocation may be deemed to be satisfied when the communication latency between the client device 520 and the currently allocated rendering resource (e.g., rendering resource 501A) starts to exceed the communication latency between the client device 520 and another rendering resource (e.g., rendering resource 501B). This other rendering resource (e.g., rendering resource 501B) then becomes the newly allocated rendering resource for the client device 520.

According to the second example mentioned above, even though a player's client device may not be physically moving with any significant velocity, there may be factors that impact the communication latency, such as network congestion. Meanwhile, the client device may have access to a second rendering resource (e.g., rendering resource 501B) for which the communication latency is less than with respect to the currently allocated rendering resource (e.g., rendering resource 501A). As such, this could warrant designating the second rendering resource (e.g., rendering resource 501B) as the allocated rendering resource for the client device.

A third example of a condition used for making a rendering resource reallocation decision could may be related to the computational load of the currently allocated rendering resource. Specifically, consider that the computational load of the currently allocated rendering resource (e.g., rendering resource 501A) is being monitored, along with the computational load of one or more other rendering resources (e.g., rendering resource 501B). In this example, the condition leading to reallocation may be deemed to be satisfied when the computational load of the currently allocated rendering resource (e.g., rendering resource 501A) starts to exceed the computational load of one of these other rendering resources (e.g., rendering resource 501B) for a certain period of time. This other rendering resource (e.g., rendering resource 501B) then becomes the newly allocated rendering resource.

A fourth example of a condition used for making a rendering resource reallocation decision may be related to the quality of the communications link between the client device 520 and the currently allocated rendering resource.

Specifically, consider that the quality of the communications link between the client device 520 and the currently allocated rendering resource (e.g., rendering resource 501A) is being monitored, along with the quality of the communications link between the client device 520 and one or more other rendering resources (e.g., rendering resource 501B). Non-limiting indicators of quality could be signal strength, error rate, retransmission rate, etc. In this example, the condition leading to reallocation may be deemed to be satisfied when the quality of the communications link between the client device 520 and the currently allocated rendering resource (e.g., rendering resource 501A) drops below the quality of the communications link between the client device 520 and another rendering resource (e.g., rendering resource 501B). This other rendering resource (e.g., rendering resource 501B) could then be designated as the allocated rendering resource.

A fifth example of a condition used for making a rendering resource reallocation decision may be related to the geographic zone where the client device 520 is located. Specifically, consider that the location or jurisdiction where the client device 520 is located is being monitored, and consider that there is a correspondence between rendering resources and assigned geographic zones. This correspondence may be maintained in a database that is accessible to the output controller 512, and may be stored locally to the control server 510 or available over the Internet 130. In this example, the condition leading to reallocation may be deemed to be satisfied when the client device 520 migrates into the geographic zone assigned to a different rendering resource than the one to which it is currently allocated. This other rendering resource then becomes the newly allocated rendering resource for the client device.

Those skilled in the art should appreciate that merely because a new rendering resource has been identified, or merely because the condition for re-allocation has been satisfied, this does not imply that re-allocation must take place immediately. Specifically, additional conditions (or pre-requisites) may need to be satisfied before reallocation may take place.

Figure 8:
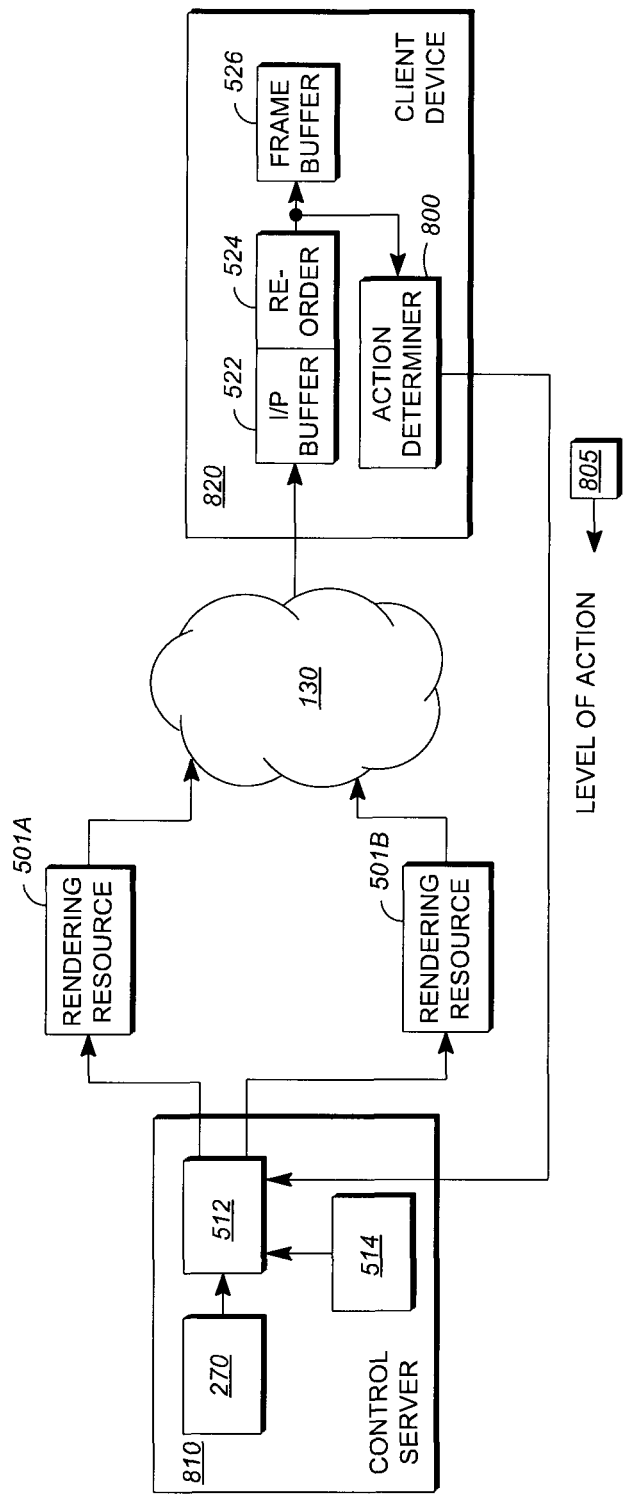
FIG. 8 is a block diagram showing use by the control server of a level of action in the game as detected by the client device.

In a first example, the output controller 512 ensures that the level of action in the game is sufficiently low before making a change to the identity of the allocated rendering resource. Accordingly, a level of action in the game is determined and compared to a predetermined threshold. In one embodiment, shown in FIG. 8, an action determiner 800 is situated at the client device 820 and a message 805 conveying a level of action is fed back to the output controller 812 at the control server 810. The action determiner 800 processes frames of video content in order to output the level of action 805. The level of action 805 can be measured based on detected visual or acoustical characteristics, including the relative number/magnitude of pixel variations from one frame to the next, the audio volume (including nuances such as crescendo), etc. Pattern detection can also be used to detect motion (and speed) of graphical elements throughout a video sequence. Also, a variety of processing algorithms could be used in order to carry out shot boundary detection. In other embodiments, the level of action can be determined by analysis of the rendering commands and therefore measurements can be done by the control server 510 or by the rendering resources 501A, 501B. In still other embodiments, the level of action can be determined based on the rate of input received from the client device 520. For example, a high degree of input received from the client device 520 may be used as a proxy for inferring a correspondingly high level of action in the video game.

In a second example, the output controller 512 ensures that the game is at a natural break point before making a change to the identity of the allocated rendering resource. Accordingly, progress throughout the game is monitored in terms of whether the player has just completed a level, has just started a level, is partly through a level, is in the process of a major battle, etc. Information about where in the game the player is located could be provided by the video game functional module 270.

In a third example, the rendering resource allocation module 514 waits until the player has paused the game before authorizing a change in the identity of the allocated rendering resource. This can enhance the seamlessness of the change in which rendering resource is designated as the allocated rendering resource. For example, consider that the player pauses the game either explicitly (which causes the issuance of a command to the video game functional module 270), or implicitly (e.g., by shutting off his/her mobile device before a flight). This paused state is detected by the video game functional module 270, which informs the output controller 512. At this point, the output controller 512 can proceed with changing the identity of the allocated rendering resource. However, there may be no effect of this change until the player turns on the mobile device upon arrival at his/her destination.

It should also be appreciated that after the identity of the allocated rendering resource has changed, it may need to be changed again at a future time. Accordingly, a subsequent rendering resource reallocation decision may be made, based on the various conditions specified above, to change the identity of the allocated rendering resource from the recently allocated rendering resource to a further newly allocated rendering resource. This further newly allocated rendering resource may be the same rendering resource as the one that was the allocated rendering resource before the most recent change, or it may be a different rendering resource altogether.

Thus, it will be appreciated that there has been described a method by virtue of which the control server generates sets of rendering commands for rendering video content for a client device and directs each of the sets of rendering commands to at least one rendering resource from a group of at least two rendering resources such that each of the rendering resources has at least some of the sets of rendering commands directed to it.

Variant (Collaborative/Distributed decision Making)

It will be appreciated that the parameters used in the rendering resource allocation decision (such as the transmission distance, communication latency, computational load and/or communications link quality, to name a few non-limiting possibilities) could be measured by the rendering resources 501A, 501B and communicated back to the control server 510 for processing and interpretation by the rendering resource allocation module 514. Alternatively, the parameters could be estimated or inferred by the control server 510 based on various sources of information such as network reports. In yet another embodiment, certain parameters could even be measured by the client device 520 and reported back to the rendering resource allocation module 514 for decision making.

Figure 7:
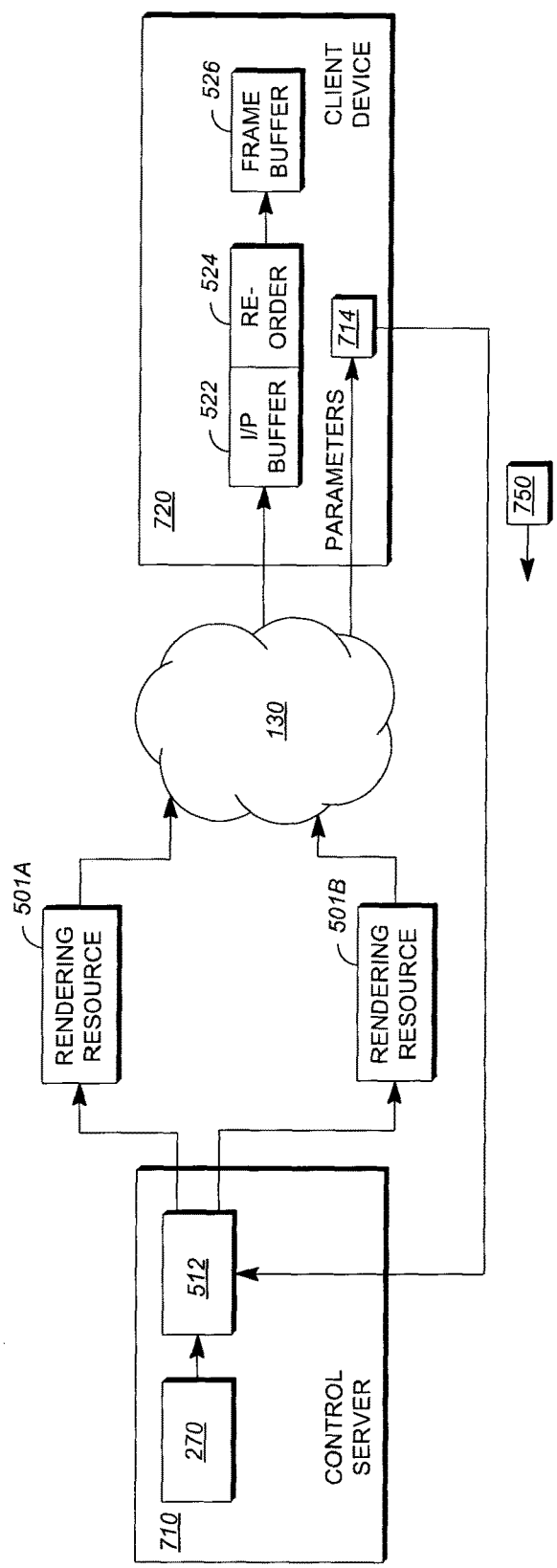
FIG. 7 shows a trigger being sent from the client device to the control server following a rendering resource allocation decision having been made by the client device.

In yet another embodiment, depicted in FIG. 7, the rendering resource allocation algorithm could be wholly or partly incorporated into a rendering resource allocation module 714 at the client device, denoted 720. Thus, based on the parameters (e.g., signal strength, communication latency, etc.) available for two or more rendering resources at the client device 720, the rendering resource allocation module 714 makes a decision as to when is the appropriate time to change the identity of the allocated rendering resource, and this information could be relayed back to the output control module 512 of the control server 710 in the form of a trigger 750. The trigger 750 could provide the identifier of the rendering resource that is to be designated as the newly allocated rendering resource for the client device 720. In such an implementation, there is no need for a rendering resource allocation module at the control server 710, as the rendering resource allocation module 714 is being implemented in the client device 720. A hybrid implementation whereby the rendering resource allocation algorithm is distributed between the control server and the client device (and possibly the rendering resources 501A, 501B) is also within the scope of the present invention.

Variant (redundancy)

In a variant, each of the rendering command sets is sent to each of at least two rendering resources among the rendering resources 501. At the client device 520, duplicate video content will be received from multiple rendering resources. The received frames can be buffered (and reordered in those cases where they are out of order). Of course, since there will be multiple copies of certain video content, these could be either not stored, or discarded before re-ordering.

With this type of approach, the design of the output controller 514 at the control server 510 is simplified, since it only needs to duplicate the rendering command sets, without burdening itself with designating an allocated rendering resource for the client device 520. The trade-off is that more bandwidth is consumed over the Internet 130, since there is a duplication of the rendering command sets (and resulting frames). In fact, the greater the number of rendering resources handling duplicate rendering command sets, the greater the bandwidth requirement. Also in this variant, the client device 520 should be designed to incorporate a feature for removing duplicate video frames that will be received from multiple rendering resources.

Persons skilled in the art should appreciate that the above-discussed embodiments are to be considered illustrative and not restrictive. Also it should be appreciated that additional elements that may be needed for operation of certain embodiments of the present invention may not have been described or illustrated, as they are assumed to be within the purview of the person of ordinary skill in the art. Moreover, certain embodiments of the present invention may be free of, may lack and/or may function without any element that is not specifically disclosed herein.

Finally, certain embodiments of the present invention may present aspects recited by the following enumerated clauses which are not claims:

1. A computer implemented method, comprising:
   generating sets of rendering commands for rendering video content for a client device;
   directing each of the sets of rendering commands to at least one rendering resource from a group of at least two rendering resources such that each of the rendering resources has at least some of the sets of rendering commands directed to it.

2. The computer implemented method defined in clause 1, wherein the directing comprises directing each set of rendering commands to a rendering resource, from among the at least two rendering resources, that is designated as an allocated rendering resource for the client device.

3. The computer implemented method defined in clause 2, further comprising:
   changing which of the at least two rendering resources is designated as the allocated rendering resource for the client device.

4. The computer implemented method defined in clause 3, further comprising:
   determining a transmission distance between the allocated rendering resource and the client device;
   wherein the changing is carried out based on the determined transmission distance.

5. The computer implemented method defined in clause 4, wherein the changing is carried out in case the determined transmission distance exceeds a predetermined threshold.

6. The computer implemented method defined in clause 3, further comprising:
   during the time when a first one of the at least two rendering resources is designated as the allocated rendering resource for the client device, identifying a second one of the at least two rendering resources that is at a shorter transmission distance to the device than the first rendering resource;
   wherein the changing comprises designating the second rendering resource as the allocated rendering resource for the client device.

7. The computer implemented method defined in clause 3, further comprising:
   determining a communication latency between the allocated rendering resource and the client device;
   wherein the changing is carried out based on the determined communication latency.

8. The computer implemented method defined in clause 7, wherein the changing is carried out in case the determined communication latency exceeds a predetermined threshold.

9. The computer implemented method defined in clause 3, further comprising:
   during the time when a first one of the at least two rendering resources is designated as the allocated rendering resource for the client device, identifying a second one of the rendering resources having a lower communication latency to the device than the first rendering resource;
wherein the changing comprises designating the second rendering resource as the allocated rendering resource for the client device.

10. The computer implemented method defined in clause 3, further comprising:
determining a computational load of the allocated rendering resource;
wherein the changing is carried out based on the determined computational load.

11. The computer implemented method defined in clause 10, wherein the changing is carried out in case the determined computational load exceeds a predetermined threshold.

12. The computer implemented method defined in clause 9, further comprising:
during the time when a first one of the at least two rendering resources is designated as the allocated rendering resource for the client device, identifying a second one of the rendering resources having a lower computational load than the first rendering resource;
wherein the changing comprises designating the second rendering resource as the allocated rendering resource for the client device.

13. The computer implemented method defined in clause 3, further comprising:
determining a quality of a communications link between the allocated rendering resource and the client device;
wherein the changing is carried out based on the determined quality of the communications link.

14. The computer implemented method defined in clause 13, wherein the changing is carried out in case the determined quality falls below a predetermined threshold.

15. The computer implemented method defined in clause 14, further comprising:
during the time when a first one of the at least two rendering resources is designated as the allocated rendering resource for the client device, identifying a second one of the rendering resources that terminates a communications link having a greater quality than the communications link between the device and the first rendering resource;
wherein the changing comprises designating the second rendering resource as the allocated rendering resource for the client device.

16. The computer implemented method defined in clause 3, further comprising:
determining a geographic location of the client device;
consulting a database specifying an association between geographic zones and respective rendering resources;
wherein the changing is carried out based on the determined geographic location and the contents of the database.

17. The computer implemented method defined in clause 16, wherein the changing is carried out in case the device is determined to have migrated into a geographic zone associated with a different rendering resource than the one that is designated as the allocated rendering resource for the client device.

18. The computer implemented method defined in clause 3, wherein the changing is carried out in response to determining that a condition has been met.

19. The computer implemented method defined in clause 18, wherein prior to determining that the condition has been met, a first rendering resource from among the at least two rendering resources is designated as the allocated rendering resource for the client device, and wherein the changing comprises designating a second rendering resource from among the at least two rendering resources as the allocated rendering resource for the client device.

20. The computer implemented method defined in clause 19, further comprising:
in response to determining that the condition has been met, duplicately sending one or more sets of rendering commands to both the first and second rendering resources, and then sending subsequent sets of rendering commands only to the second rendering resource.

21. The computer implemented method defined in clause 19, further comprising:
in response to determining that the condition has been met, sending a message to the client device, the message identifying the second rendering resource.

22. The computer implemented method defined in clause 21, further comprising:
transmitting a respective sequence identifier with each set of rendering commands, the sequence identifier indicating a position of the respective set of rendering commands relative to other sets of rendering commands;
wherein the message conveys the sequence identifier of one or more sets of rendering commands scheduled to be directed to the second rendering resource.

23. The computer implemented method defined in clause 22, wherein the message is sent together with at least one rendering command set directed to the first rendering resource.

24. The computer implemented method defined in clause 22, wherein the message is sent to the device in an out-of-band message.

25. The computer implemented method defined in clause 19, further comprising:
determining a transmission distance between the client device and each of the first and second rendering resources;
wherein the condition is considered to have been met in case the device is determined to be at a shorter transmission distance to the second rendering resource than to the first rendering resource.

26. The computer implemented method defined in clause 19, further comprising:
determining a communication latency between the client device and each of the first and second rendering resources;
wherein the condition is considered to have been met in case the communication latency involving the second rendering resource is lower than the communication latency involving the first rendering resource.

27. The computer implemented method defined in clause 19, further comprising:
determining a computational load of each of the first and second rendering resources;
wherein the condition is considered to have been met in case the computation load of the second rendering resource is lower than the computational load of the first rendering resource.

28. The computer implemented method defined in clause 19, further comprising:
determining a quality of a communications link between the client device and each of the first and second rendering resources;
wherein the condition is considered to have been met in case the quality of the link involving the second rendering resource is greater than the quality of the link involving the first rendering resource.

29. The method defined in clause 1, wherein the changing is carried out in response to detecting receipt of a trigger.

30. The method defined in clause 29, further comprising: receiving the trigger from the client device.

31. The method defined in clause 30, wherein the trigger conveys an instruction to change which of the at least two rendering resources is designated as the allocated rendering resource.

32. The method defined in clause 30, wherein the trigger conveys an identifier of a second rendering resource to be designated as the allocated rendering resource.

33. The method defined in clause 3, further comprising:
maintaining in a memory an identifier of the rendering resource that is designated as the allocated rendering resource.

34. The computer implemented method defined in clause 3, wherein each set of rendering commands defines an image having a position in time relative to other images defined by other sets of rendering commands.

35. The method defined in clause 34, further comprising:
processing the sets of rendering commands by the allocated rendering resource to produce corresponding video content for the client device.

36. The method defined in clause 35, further comprising:
causing the video content to be transmitted over the Internet to the client device.

37. The computer implemented method defined in clause 36, wherein the video content comprises data representative of video game images.

38. The method defined in clause 1, implemented by a control server, wherein the at least two rendering resources comprise rendering servers that are remote from the control server.

39. The method defined in clause 38, further comprising receiving control input from the client device over the Internet.

40. The computer implemented method defined in clause 39, further comprising executing a video game program for the client device.

41. The method defined in clause 40, further comprising updating a game state of the video game based on the control input from the client device.

42. The method defined in clause 41, wherein updating the game state includes updating objects in a 3D virtual environment.

43. The method defined in clause 42, wherein the sets of rendering commands are generated based on a projection of the 3D virtual environment from a perspective associated with the client device.

44. The computer implemented method defined in clause 3, further comprising:
determining a level of action in the video game;
wherein the changing is carried out in case the level of action in the video game is determined to be low.

45. The computer implemented method defined in clause 3, further comprising:
determining progress in the video game;
wherein the changing is carried out in case the progress in the video game is determined to be at a break in the game.

46. The computer implemented method defined in clause 3, further comprising:
determining whether the video game has been paused;
wherein the changing is carried out in case the video game is determined to have been paused.

47. The computer implemented method defined in clause 19, wherein changing which of the at least two rendering resources is designated as the allocated rendering resource further comprises second changing which of the at least two rendering resources is designated as the allocated rendering resource for the client device in response to determining that a second condition has been met.

48. The computer implemented method defined in clause 47, the second changing comprises designating a new rendering resource from among the at least two rendering resources as the allocated rendering resource for the client device.

49. The computer implemented method defined in clause 48, wherein the new rendering resource is a third rendering resource that is neither the first rendering resource nor the second rendering resource.

50. The computer implemented method defined in clause 48, wherein the new rendering resource is the first rendering resource.

51. The computer implemented method defined in clause 1, wherein the directing comprises directing at least some of the sets of rendering commands to each of the at least two rendering resources.

52. The computer implemented method defined in clause 1, wherein the directing comprises directing each of the sets of rendering commands to no more than one of the at least two rendering resources.

53. The computer implemented method defined in clause 1, wherein the directing comprises directing first ones of the sets of rendering commands to a first one of the rendering resources prior to determining that a condition has been met and directing second ones of the sets of rendering commands to a second one of the rendering resources after determining that the condition has been met.

54. A computer-readable storage medium comprising computer-readable instructions which, when executed by a computing entity, cause the computing entity to implement a method that comprises:
generating sets of rendering commands for rendering video content for a client device;
directing each of the sets of rendering commands to at least one rendering resource from a group of at least two rendering resources such that each of the rendering resources has at least some of the sets of rendering commands directed to it.

55. The computer-readable storage medium defined in clause 54, wherein the directing comprises directing each set of rendering commands to a rendering resource, from among the at least two rendering resources, that is designated as an allocated rendering resource for the participant.

56. The computer-readable storage medium defined in clause 55, wherein the method further comprises:
changing which of the at least two rendering resources is designated as the allocated rendering resource for the participant.

57. The computer-readable storage medium defined in clause 55, wherein the changing is carried out in response to determining that a condition has been met.

58. The computer-readable storage medium defined in clause 57, wherein prior to determining that the condition has been met, a first rendering resource from among the at least two rendering resources is designated as the allocated rendering resource for the client device, and wherein the changing comprises designating a second rendering resource from among the at least two rendering resources as the allocated rendering resource for the client device.

59. The computer-readable storage medium defined in clause 54, wherein the directing comprises directing at least some of the sets of rendering commands to each of the at least two rendering resources.

60. The computer-readable storage medium defined in clause 54, wherein the directing comprises directing each of the sets of rendering commands to no more than one of the at least two rendering resources.

61. The computer-readable storage medium defined in clause 54, wherein the directing comprises directing first ones of the sets of rendering commands to a first one of the rendering resources prior to determining that a condition has been met and directing second ones of the sets of rendering commands to a second one of the rendering resources after determining that the condition has been met.

62. An apparatus, comprising:
a control module for generating sets of rendering commands for rendering video content for a client device;
an output controller for directing each of the sets of rendering commands to at least one rendering resource from a group at least two rendering resources such that each of the rendering resources has at least some of the sets of rendering commands directed to it.

63. The apparatus defined in clause 62, wherein the directing comprises directing each set of rendering commands to a rendering resource, from among the at least two rendering resources, that is designated as an allocated rendering resource for the participant, and wherein the server further comprises:
rendering resource allocation logic for making a decision about which of the rendering resources is the designated rendering resource and for informing the output controller of the decision.

64. A server system, comprising:
a first rendering server configured for generating first video frames for a client device based on first sets of rendering commands received while the first rendering server is designated as an allocated rendering server for the client device, and for sending the first video frames to the client device; and
a second rendering server configured for generating second video frames for the client device based on second sets of rendering commands received while the second rendering server is designated as an allocated rendering server for the client device, and for sending the second video frames to the client device.

65. The server system defined in clause 64, wherein the first and second rendering servers are configured for receiving a sequence identifier with each of the first and second sets of rendering commands, respectively, and for propagating each received sequence identifier with a corresponding one or more of the first and second video frames, respectively, sent to the client device.

66. The server system defined in clause 64, further comprising:
a control server configured for sending the first sets of rendering commands to the first rendering server prior to determining that a condition has been met and for sending the second sets of rendering commands to the second rendering server after determining that the condition has been met.

67. A method for execution by a processing entity of a client device engaged in a session over the Internet with a control server, comprising:
sending input to the control server over the Internet;
responsive to the input, receiving first video content via the Internet from a first rendering resource and receiving second video content via the Internet from a second rendering resource different from the first rendering resource;
displaying the first video content and then the second video content via a display of the client device.

68. The method defined in clause 67, wherein at least some of the second video content is received after at least some of the first video content.

69. The method defined in clause 67, wherein the first video content is generated by the first rendering resource.

70. The method defined in clause 69, wherein the second video content is generated by the second rendering resource.

71. The method defined in clause 70, wherein the first and second video content is generated based on sets of rendering commands received from a single source.

72. The method defined in clause 67, further comprising:
while receiving the first video content, determining that the client device is at a shorter distance from the second rendering resource than from the first rendering resource;
transmitting a trigger to the control server;
wherein receiving the second video content begins after transmitting the trigger.

73. The method defined in clause 67, further comprising:
while receiving the first video content, determining that a communication latency between the client device and the second rendering resource is lower than the communication latency between the client device and the first rendering resource;
transmitting a trigger to the control server;
wherein receiving the second video content begins after transmitting the trigger.

74. The method defined in clause 67, further comprising:
while receiving the first video content, determining that a signal strength from the second rendering resource is greater than the signal strength from the first rendering resource;
transmitting a trigger to the control server;
wherein receiving the second video content begins after transmitting the trigger.

75. The method defined in clause 67, further comprising:
receiving external input from a user of the client device;
transforming the external input the input sent to the control server.

76. The method defined in clause 67, wherein the first and second video content is received over the same, continuously maintained Internet connection.

77. The method defined in clause 67, wherein the first video content is received over a first Internet connection and wherein the second video content is received over a second Internet connection distinct from the first Internet connection.

78. The method defined in clause 67, wherein the first and second video content is received in an encoded form, the method further comprising:
decoding the video content to obtain decoded video content;
wherein the displayed video content is the decoded video content.

79. The method defined in clause 67, wherein the first and second video content is divided into frames, the method further comprising:
receiving a sequence identifier with each of the received frames;
reordering the received frames in accordance with the sequence identifiers.

Those skilled in the art will also appreciate that additional adaptations and modifications of the described embodiments can be made. The scope of the invention, therefore, is not to be limited by the above description of specific embodiments but rather is defined by the claims attached hereto.

The invention claimed is:

1. A computer implemented method, comprising:
    generating sets of rendering commands for rendering video content for a client device, the video content comprising game images, the rendering commands being generated based on client device input received during gameplay;
    directing each of the sets of rendering commands to at least one rendering resource from a group of at least two rendering resources such that each of the at least two rendering resources has at least some of the sets of rendering commands directed thereto, one of the at least two rendering resources being designated as an allocated rendering resource for the client device;
    processing the sets of rendering commands directed to the allocated rendering resource for the client device to produce corresponding video content comprising a portion of the game images for the client device;
    based on determining that at least one condition has been met, changing which of the at least two rendering resources is designated as the allocated rendering resource for the client device; and
    sending a message to the client device to alert the client device as to an identity of a rendering resource newly designated as the allocated rendering resource for the client device.

2. The computer implemented method defined in claim 1, further comprising:
    determining a transmission distance between the allocated rendering resource and the client device,
    wherein the determining that the at least one condition has been met comprises determining that the transmission distance between the allocated rendering resource and the client device is greater than a transmission distance between another one of the at least two rendering resources and the client device.

3. The computer implemented method defined in claim 1, further comprising:
    determining a communication latency between the allocated rendering resource and the client device,
    wherein the determining that the at least one condition has been met comprises determining that the communication latency between the allocated rendering resource and the client device is greater than a communication latency between another one of the at least two rendering resources and the client device.

4. The computer implemented method defined in claim 1, further comprising:
    determining a computational load of the allocated rendering resource,
    wherein the determining that the at least one condition has been met comprises determining that the computational load of the allocated rendering resource is greater than a computational load of another one of the at least two rendering resources.

5. The computer implemented method defined in claim 1, further comprising:
    determining a quality of a communications link between the allocated rendering resource and the client device,
    wherein the determining that the at least one condition has been met comprises determining that the quality of the communications link between the allocated rendering resource and the client device is below a quality of a communications link between another one of the at least two rendering resources and the client device.

6. The computer implemented method defined in claim 1, further comprising:
    determining a geographic location of the client device; and
    consulting a database specifying associations between geographic zones and the at least two rendering resources,
    wherein the determining that the at least one condition has been met comprises determining, based on the determined geographic location and contents of the database, that the client device has migrated into one of the geographic zones assigned to one of the at least two rendering resources other than the allocated rendering resource.

7. The computer implemented method defined in claim 1, wherein, prior to determining that the at least one condition has been met, a first rendering resource from among the at least two rendering resources is designated as the allocated rendering resource for the client device, and
    wherein the changing comprises designating a second rendering resource from among the at least two rendering resources as the allocated rendering resource for the client device.

8. The computer implemented method defined in claim 7, further comprising:
    in response to the determining that the at least one condition has been met, duplicately sending one or more sets of rendering commands to both the first rendering resource and the second rendering resource, and then sending subsequent sets of rendering commands only to the second rendering resource.

9. The method defined in claim 1, further comprising receiving a trigger from the client device, wherein the changing is carried out in response to detecting receipt of the trigger.

10. The computer implemented method defined in claim 1, further comprising:
    determining progress in a video game,
    wherein the changing is carried out only in a case the progress in the video game is determined to be at a break in the video game.

11. The computer implemented method defined in claim 1, further comprising:
    determining whether a video game has been paused,
    wherein the changing is carried out only in a case the video game is determined to have been paused.

12. A non-transitory computer-readable storage medium comprising computer-readable instructions which, when executed by a computing entity, cause the computing entity to implement a method that comprises:
    generating sets of rendering commands for rendering video content for a client device, the video content comprising game images, the rendering commands being generated based on client device input received during gameplay;
    directing each of the sets of rendering commands to at least one rendering resource from a group of at least two rendering resources such that each of the at least two rendering resources has at least some of the sets of rendering commands directed thereto, one of the at least two rendering resources being designated as an allocated rendering resource for the client device;
    processing the sets of rendering commands directed to the allocated rendering resource for the client device to produce corresponding video content comprising a portion of the game images for the client device;

based on determining that at least one condition has been met, changing which of the at least two rendering resources is designated as the allocated rendering resource for the client device; and sending a message to the client device to alert the client device as to an identity of a rendering resource newly designated as the allocated rendering resource for the client device.

13. A server system, comprising:

a first rendering server configured for generating first video frames for a client device based on first sets of rendering commands received while the first rendering server is designated as an allocated rendering server for the client device, and for sending the first video frames to the client device; and a second rendering server configured for generating second video frames for the client device based on second sets of rendering commands received while the second rendering server is designated as an allocated rendering server for the client device, and for sending the second video frames to the client device;

wherein the first rendering server is configured to be changed to the second rendering server upon at least one condition having been met.

14. A method for execution by a processing entity of a client device engaged in a session over the Internet with a control server, the method comprising:

sending input, received during gameplay, to the control server over the Internet; and responsive to the input;

receiving first video content via the Internet from a first rendering resource;

receiving a message that alerts the client device of an identity of a second rendering resource different from the first rendering resource; and receiving second video content via the Internet from the second rendering resource; and displaying the first video content and then the second video content via a display of the client device.

15. The method of claim 14, wherein the message is responsive to at least one condition having been met.

16. The server of system of claim 13, wherein at least one of the first rendering server and the second rendering server is configured to transmit a message that alerts the client device of an identity of the second rendering server.

17. The non-transitory computer-readable storage medium of claim 12, wherein the instructions, when executed by the computing entity, cause the computing entity to further perform determining progress in a video game, and wherein the changing is carried out only in a case the progress in the video game is determined to be at a break in the video game.

18. The non-transitory computer-readable storage medium of claim 12, wherein the instructions, when executed by the computing entity, cause the computing entity to further perform determining a transmission distance between the allocated rendering resource and the client device, and wherein the determining that the at least one condition has been met comprises determining that the transmission distance between the allocated rendering resource and the client device is greater than a transmission distance between another one of the at least two rendering resources and the client device.

19. The non-transitory computer-readable storage medium of claim 12, wherein the instructions, when executed by the computing entity, cause the computing entity to further perform determining a communication latency between the allocated rendering resource and the client device, and wherein the determining that the at least one condition has been met comprises determining that the communication latency between the allocated rendering resource and the client device is greater than a communication latency between another one of the at least two rendering resources and the client device.

20. The non-transitory computer-readable storage medium of claim 12, wherein the instructions, when executed by the computing entity, cause the computing entity to further perform determining a computational load of the allocated rendering resource, and wherein the determining that the at least one condition has been met comprises determining that the computational load of the allocated rendering resource is greater than a computational load of another one of the at least two rendering resources.

* * * * *